(12) United States Patent
Hakkaku et al.

(10) Patent No.: US 11,220,067 B2
(45) Date of Patent: Jan. 11, 2022

(54) SHAPING SYSTEM

(71) Applicant: MIMAKI ENGINEERING CO., LTD., Nagano (JP)

(72) Inventors: Kunio Hakkaku, Nagano (JP); Hiroyoshi Ohi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 90 days.

(21) Appl. No.: 16/899,602

(22) Filed: Jun. 12, 2020

(65) Prior Publication Data

US 2020/0307120 A1 Oct. 1, 2020

Related U.S. Application Data

(62) Division of application No. 15/769,341, filed as application No. PCT/JP2016/081291 on Oct. 21, 2016, now Pat. No. 10,730,244.

(30) Foreign Application Priority Data

Oct. 23, 2015 (JP) .............................. JP2015-209353
Nov. 5, 2015 (JP) .............................. JP2015-217901

(51) Int. Cl.
*B29C 67/00* (2017.01)
*B29C 64/386* (2017.01)
*G06T 19/20* (2011.01)
*B33Y 50/02* (2015.01)
*B33Y 50/00* (2015.01)
*B33Y 30/00* (2015.01)
*B33Y 10/00* (2015.01)

(52) U.S. Cl.
CPC ............ *B29C 67/00* (2013.01); *B29C 64/386* (2017.08); *G06T 19/20* (2013.01); *B33Y 10/00* (2014.12); *B33Y 30/00* (2014.12); *B33Y 50/00* (2014.12); *B33Y 50/02* (2014.12)

(58) Field of Classification Search
CPC ....... B29C 67/00; B29C 64/386; G06T 19/20; B33Y 10/00; B33Y 30/00; B33Y 50/00; B33Y 50/02
See application file for complete search history.

*Primary Examiner* — Tejal Gami
(74) *Attorney, Agent, or Firm* — JCIPRNET

(57) ABSTRACT

A shaping system is provided and includes: a shaping executing part configured to execute shaping of a three-dimensional object and including multiple inkjet heads that respectively discharge ink droplets of colors different from each other; and a shaping controlling part configured to control an operation of the shaping executing part. The shaping controlling part accepts a designation of a shaping color being a color of the three-dimensional object to be shaped based on a shaping data from an user, and causes the shaping executing part to shape the three-dimensional object so that at least an outer appearance of the three-dimensional object is colored in the shaping color which is designated. The shaping executing part shapes the three-dimensional object according to a control by the shaping controlling part, and colors at least an outer appearance of the three-dimensional object in the shaping color designated by the user using multiple inkjet heads.

7 Claims, 10 Drawing Sheets

SHAPING SYSTEM

CROSS-REFERENCE TO RELATED APPLICATION

This application is a divisional application of U.S. application Ser. No. 15/769,341, filed on Apr. 19, 2018, now allowed, which is a 371 application of the international PCT application serial no. PCT/JP2016/081291, filed on Oct. 21, 2016, which claims the priority benefits of Japan application no. 2015-209353, filed on Oct. 23, 2015 and Japan application no. 2015-217901, filed on Nov. 5, 2015. The entirety of each of the above-mentioned patent applications is hereby incorporated by reference herein and made a part of this specification.

TECHNICAL FIELD

The present invention relates to a shaping system, a method for controlling shaping operation, a shaping control device, and a program.

BACKGROUND ART

In recent years, a three-dimensional (3D) printer, a shaping device that shapes three-dimensional objects (shaped objects), is becoming popularized. Further, an inkjet method using an inkjet head and the like is known as a method for executing shaping using a shaping device (see Patent Literature 1).

CITATION LIST

Patent Literature

Patent Literature 1: Japanese Unexamined Patent Publication No. 2015-71282

SUMMARY OF INVENTION

Technical Problems

A shaping device that shapes a three-dimensional object using an inkjet method and the like shapes the three-dimensional object by a laminate shaping scheme using a configuration that makes use of a printer (inkjet printer) that prints two-dimensional (2D) images. Further, when the three-dimensional object is to be shaped as above, time required for an operation of the shaping generally is considerably long as compared to a case of printing a two-dimensional image using an inkjet printer and the like. In a case of shaping a three-dimensional object with a long side of about a few to thirty centimeters, this would take generally a few hours to a few days (about two days) or more.

Further, an outcome of the shaping by the shaping device is generally more difficult to predict beforehand than the case of printing two-dimensional images. Due to this, texture, touch feeling, glossiness, reproducibility of details, and the like of the three-dimensional object to be shaped cannot be sufficiently predicted before the shaping in some cases. Further, in the case of coloring the three-dimensional object (color application), color tone, color strength, resolution, and the like to be actually realized cannot be sufficiently predicted before the shaping in some cases. Due to this, in the case of shaping the three-dimensional object using the shaping device, the outcome of the shaping may differ from what has been expected in some cases.

However, as aforementioned, the shaping of the three-dimensional object may take long time such as a few hours to a few days in some cases. Further, in such a case, if the outcome of the shaping is different from what has been expected, time and cost are tremendously lost. Further, in cases where a shaping manufacturer is to execute the shaping according to orders from others such as clients, there is a risk that the manufacturer cannot be able to execute the shaping meeting the expectation of the clients and the like in some cases, which results in dissatisfaction in its service. Due to this, a configuration that can more suitably execute the shaping with desired shaping quality has long been sought for. The present invention aims to provide a shaping system, a method for controlling shaping operation, a shaping control device, and a program that can provide solution to the aforementioned problem.

Further, in the case of shaping the three-dimensional object by the inkjet method, a colored three-dimensional object can be shaped by executing the shaping using a plurality of colors of ink. In this case, the colored three-dimensional object is shaped by executing the shaping of at least a surface portion of the three-dimensional object in a method that is identical or similar to that of the technique for printing the two-dimensional image using a known printer.

However, depending on a purpose of use of the three-dimensional object to be shaped and a purpose of the shaping, there may be a case that is more desirable to shape a three-dimensional object colored by a more simplified method. The present invention aims to provide a shaping system, a method for controlling shaping operation, a shaping control device, and a program that can provide solution to the aforementioned problem.

Solutions to the Problems

The inventor of the present application has conducted keen study on a method to prevent outcomes of shaping from becoming different from expectation. As such a method, a method for checking for various shaping qualities beforehand has been considered more specifically. Further, as the method for checking the shaping quality beforehand, forming a sample three-dimensional object, which is different from a target three-dimensional object, has been considered. Furthermore, shaping the sample three-dimensional object that can be shaped with a shorter time than that required for shaping the target three-dimensional object has been considered.

That is, to solve the above problems, the present invention is a shaping system configured to shape a three-dimensional object based on shaping data that expresses the three-dimensional object, the system including: a shaping executing part configured to execute shaping of the three-dimensional object; and a shaping controlling part configured to control an operation of the shaping executing part. The shaping controlling part is capable of executing a first shaping control for causing the shaping executing part to shape a first three-dimensional object using the shaping data that expresses the first three-dimensional object, and a second shaping control for causing the shaping executing part to shape a second three-dimensional object using at least a part of the shaping data that expresses the first three-dimensional object, and the second three-dimensional object is a three-dimensional object for checking a shaping quality of the first three-dimensional object, and is a three-dimensional object that can be shaped in a shorter time than that required for shaping the first three-dimensional object.

In this case, the three-dimensional object is a three-dimensional object that is shaped by the shaping executing part. Further, the first three-dimensional object is a target three-dimensional object (shaped object) which is aimed to be shaped as a resulting object. Further, the second three-dimensional object is a three-dimensional object (shaped object) for checking the shaping quality for the target three-dimensional object. Further, the shaping quality includes texture, touch feeling, glossiness, reproducibility of details, and the like of the three-dimensional object to be shaped. Further, in a case of shaping a colored three-dimensional object, the shaping quality may include color tone, color strength, and resolution and the like of a color to be applied. Further, coloring may include, when the target three-dimensional object is seen, a single color on all surfaces, a plurality of color patterns such as letters and patterns, and full-color application matching actual colors of a person, animals, plants, and the like.

By the configuration as above and shaping the second three-dimensional object, which can be shaped with a shorter time, a shaping check function for checking the shaping quality in advance can be realized without shaping the first three-dimensional object by actually taking long time to do so. Further, due to this, the shaping quality of the first three-dimensional object can suitably be checked in advance, and when the first three-dimensional object is thereafter shaped, an occurrence of an outcome of the shaping becoming different from what has been expected can suitably be prevented. Further, when a shaping manufacturer is to perform the shaping according to orders from others such as clients, shaping that meets the expectation of the clients can more suitably be executed by conducting advance checks on the shaping quality and settling agreements thereon with the clients. Due to this, by the configuration as above, the shaping with the desired shaping quality can more suitably be executed.

It should be noted that the second three-dimensional object is preferably a three-dimensional object that is smaller than the first three-dimensional object. More specifically, the second three-dimensional object may be a three-dimensional object that is a miniature of the first three-dimensional object, or a three-dimensional object corresponding to a portion of the first three-dimensional object. Further, the first three-dimensional object and the second three-dimensional object may be a three-dimensional object at least a part of which is colored. Further, the shaping controlling part may receive a user instruction via a user interface, and execute one of the first and second shaping controls according to the received instruction.

Further, in a case of shaping a colored three-dimensional object, data including color information expressing a color of the three-dimensional object and shape information may be used as the shaping data that expresses the three-dimensional object. However, in this case, since the color information is designated by the shaping data, it is difficult to change the color of the three-dimensional object to be shaped. Further, as a result, if the three-dimensional object is to be shaped by changing the color, it is necessary to recreate the shaping data.

With respect to this, regarding the color to be applied to the three-dimensional object, the inventor of the present application has considered having user designate the color upon the shaping (immediately before the shaping) instead of using the color information included in the shaping data. By the configuration as above, a three-dimensional object with various colors can more easily be shaped without recreating the shaping data.

Further, in this case, since the color does not need to be designated by the shaping data, a data amount of the shaping data can be reduced. Further, it is also possible to use widely-used data, such as data in a stereolithography (STL) format, as the shaping data to easily and suitably shape a colored three-dimensional object.

That is, to solve the above problem, the present invention is a shaping system configured to shape a three-dimensional object based on shaping data that expresses the three-dimensional object, the system including: a shaping executing part being a part for executing shaping of the three-dimensional object, and including a plurality of inkjet heads configured to respectively discharge ink droplets of colors different from each other; and a shaping controlling part configured to control an operation of the shaping executing part. The shaping controlling part accepts a designation of a shaping color being a color of the three-dimensional object to be shaped based on the shaping data, from a user, and causes the shaping executing part to shape the three-dimensional object so that at least an outer appearance of the three-dimensional object is colored in the designated shaping color, and the shaping executing part shapes the three-dimensional object according to control by the shaping controlling part, and colors at least the color of the outer appearance of the three-dimensional object in the shaping color designated by the user using the plurality of inkjet heads.

By the configuration as above, the shaping color to be applied to the three-dimensional object is not designated by the shaping data, but is designated according to the user instruction given to the shaping controlling part, as a result of which various shaping colors can easily and suitably be designated. Further, by performing the shaping using the inkjet heads for a plurality of colors different from each other, the shaping with the designated shaping color can suitably be performed. Due to this, by the configuration as above, a colored three-dimensional object can suitably be shaped with a simple method.

Further, in this case, the shaping controlling part accepts designation of only one color from the user as the shaping color to be applied to one three-dimensional object. Further, due to this, the shaping controlling part causes the shaping executing part to shape the three-dimensional object having its outer appearance colored in the single shaping color. By the configuration as above, the colored three-dimensional object can more easily and suitably be shaped.

Here, in this configuration, the ink droplets refer to droplets of ink. The ink refers to liquid to be discharged from inkjet heads. Further, inkjet heads refer to discharging heads for discharging liquid (droplets) using an inkjet scheme. Further, the shaping executing part uses the plurality of inkjet heads to shape the three-dimensional object using a laminate shaping scheme using the inkjet method.

Further, the shaping executing part preferably includes inkjet heads for a plurality of colors capable of full-color expression as the inkjet heads for a plurality of colors. The shaping executing part preferably includes respective inkjet heads for Y (yellow), M (magenta), C (cyan), and K (black). Inkjet heads for colors other than the above may further be provided. Further, an inkjet head for modeling material (shaping material) to be used for shaping inside of the three-dimensional object, and an inkjet head for a support portion for supporting around the three-dimensional object during the shaping may further be provided.

Further, as the shaping data, data that expresses only a shape of the three-dimensional object without designating any color may be used. Further, as the shaping data, data that expresses a color of the three-dimensional object in addition to its shape may be used. In this case, when the user designates the shaping color, the shaping executing part is caused to shape the three-dimensional object using the shaping color designated by the user instead of the color designated by the shaping data. In this case, the shaping controlling part may replace the color designated by the shaping data by the shaping color designated by the user. By the configuration as above, a desired shaping color can easily and suitably be set to a region to be colored in the three-dimensional object.

Further, in this configuration, the color of the outer appearance of the three-dimensional object is a color of a surface of the three-dimensional object. Further, the color of the surface of the three-dimensional object may be a color in a range in which a hue of the three-dimensional object can be visibly recognized from outside. Further, the shaping color to be designated by the user is a color to be applied to an entirety of the surface of the three-dimensional object. By the configuration as above, the designation of the shaping color can more easily and suitably be performed as compared to a case of coloring the three-dimensional object by drawing a color image on the surface thereof. Further, the shaping controlling part preferably accepts the designation of the shaping color from the user via a user interface to be operated by the user of the shaping system. Further, as such a user interface, a graphical user interface (GUI) is preferably used. By the configuration as above, the designation of the shaping color can easily and suitably be accepted.

Further, the shaping controlling part generates shaping control data, which is data that controls the operation of the shaping executing part, based on the shaping data and the shaping color designated by the user. Further, the operation of the shaping executing part is controlled by supplying the shaping data to the shaping executing part. By the configuration as above, the three-dimensional object colored in the shaping color can suitably be shaped by the shaping executing part.

Further, the shaping controlling part may accept designation of a plurality of shaping colors different from each other from the user for single shaping data. In this case, the shaping controlling part causes the shaping executing part to shape three-dimensional objects having same shape in the respective shaping colors. By the configuration as above, a plurality of three-dimensional objects having the same shape and different colors can easily and suitably be shaped.

Further, as a configuration of the present invention, a method for controlling shaping operation, a shaping control device, a program and the like having the features as described above may be considered. In these cases as well, the same effects as above can be achieved.

Effect of the Invention

According to the present invention, shaping with a desired shaping quality can more suitably be executed.

Further, according to the present invention, a colored three-dimensional object can be shaped suitably with a simple method.

BRIEF DESCRIPTION OF THE DRAWINGS

FIG. 1(a) illustrates an example of a configuration of a primary part of the shaping system 10. FIG. 1(b) illustrates an example of a configuration of a three-dimensional object 50 to be shaped by the shaping system 10.

FIG. 3(a) illustrates an example of a screen for basic setting (proof setting) in a case of executing the proof shaping. FIG. 3(b) illustrates an example of a setting screen for partial proof shaping (partial proof setting screen).

FIG. 7(a) illustrates an example of a configuration of a primary part of the shaping system 10. FIG. 7(b) illustrates an example of a configuration of a three-dimensional object 50 to be shaped by the shaping system 10.

FIG. 10(a) is a cross-sectional diagram illustrating an example of a specific example of the three-dimensional object 50. FIGS. 10(b) and 10(c) are diagrams illustrating a variant of the configuration of the three-dimensional object 50. FIG. 10(d) is a diagram illustrating another variant of the configuration of the three-dimensional object 50.

DESCRIPTION OF EMBODIMENT

Figure 1A:
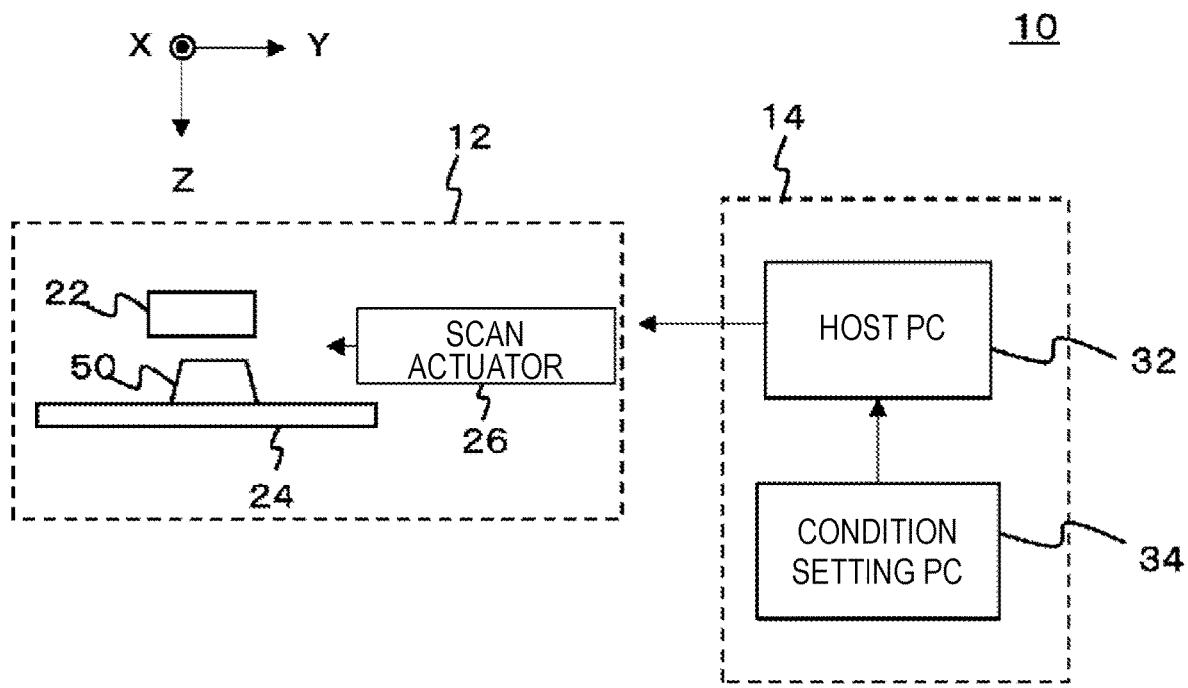
FIG. 1(a) and FIG. 1(b) are diagrams illustrating an example of a shaping system 10 according to an embodiment of the present invention.
Figure 1B:
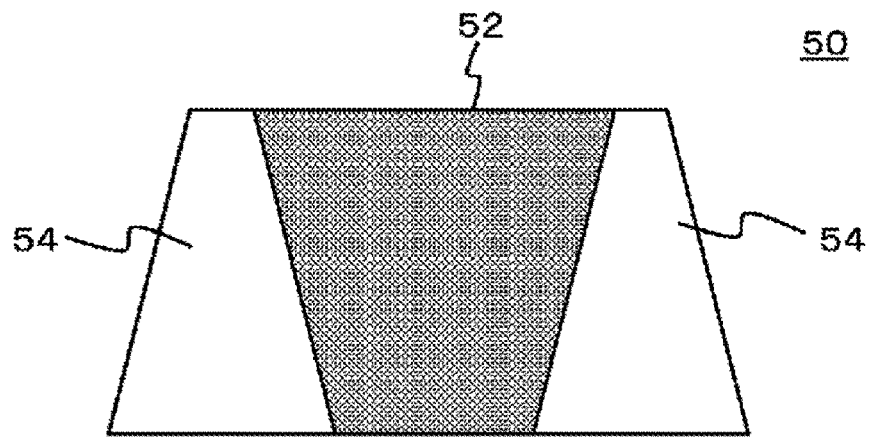

Hereinbelow, embodiments according to the present invention will be described with reference to the drawings. FIG. 1(a) and FIG. 1(b) are diagrams illustrating an example of a shaping system 10 according to an embodiment of the present invention. FIG. 1(a) illustrates an example of a configuration of a primary part of the shaping system 10. FIG. 1(b) illustrates an example of a configuration of a three-dimensional object 50 to be shaped by the shaping system 10.

The shaping system 10 is a shaping system configured to shape a three-dimensional object based on shaping data that expresses the three-dimensional object, and shapes the three-dimensional object 50 by a laminate shaping scheme using an inkjet method that uses inkjet heads. Further, as the three-dimensional object 50, a three-dimensional object including an object portion 52 and a support portion 54 is to be shaped. In this case, the object portion 52 is a portion to be a resulting object of the shaping (shaped object portion). Further, the support portion 54 is a portion for supporting the object portion 52 during the shaping, and is formed around the object portion 52 during the shaping as needed, according to a shape of the object portion 52 to be shaped. Further, the support portion 54 is formed by water soluble material or the like, and is removed after completion of the shaping.

By the configuration as above, three-dimensional objects 50 having various shapes such as a three-dimensional object 50 having an overhang portion can suitably be shaped.

It should be noted that, in FIG. 1(b), the shape of the three-dimensional object 50 is depicted with simplification for the convenience of illustration. However, in the actual shaping system 10, a three-dimensional object 50 with a more complicated shape may be shaped. In this case, a three-dimensional object 50 of which object portion 52 has a shape that is to become a human figure may be shaped. Further, aside from the features explained above and hereafter, the shaping system 10 may have features identical or similar to those of a conventionally known shaping system.

Further, in this embodiment, the shaping system 10 includes a shaping executing part 12 and a shaping controlling part 14. The shaping executing part 12 is a section that executes the shaping of the three-dimensional object 50 in the shaping system 10. Further, in this embodiment, the shaping executing part 12 is the section that shapes the three-dimensional object 50 by the laminate shaping scheme using the inkjet method, and thus includes a head portion 22, a shaping stage 24, and a scan actuator 26. As the shaping executing part 12, a conventionally-known shaping device (3D printer) may be used. Further, the shaping executing part 12 may be a device that is obtained by modifying a part of a conventionally-known inkjet printer.

The head portion 22 is a portion that discharges various types of materials that are to constitute the three-dimensional object 50. In this embodiment, the head portion 22 include an inkjet head, and discharges droplets of the materials of the three-dimensional object 50 by the inkjet scheme. Further, in this case, the head portion 22 may include a plurality of inkjet heads according to the number (type) of the materials to be used in the shaping of the three-dimensional object 50.

More specifically, the head portion 22 may include an inkjet head for a material configuring inside of the object portion 52 (modeling material), an inkjet head for coloring, and an inkjet head for a material configuring the support portion 54 (support material). Further, in this case, as the coloring inkjet head, a plurality of inkjet heads for ink of a plurality of colors different from each other (yellow, magenta, cyan, and black) may be provided. Further, in a case of shaping a colored three-dimensional object 50, it is further preferable to use an inkjet head for white ink, and an inkjet head for transparent clear ink. Further, in this case, the colored three-dimensional object 50 more specifically means a three-dimensional object 50 having at least a part of a surface of its object portion 52 colored.

Further, in this embodiment, the head portion 22 discharges the droplets of the respective materials to respective positions of the three-dimensional object 50 by performing a main scanning operation of moving along a preset main scanning direction (Y direction in the figure) relative to the three-dimensional object 50 and discharging the droplets. As the droplets of the respective materials, the head portion 22 preferably discharges droplets of materials that harden according to predetermined conditions. As such materials, ultraviolet curable ink may be used. Further, in this case, the head portion 22 may further include an ultraviolet light source that emits ultraviolet light.

The shaping stage 24 is a stage member that supports the three-dimensional object 50 during shaping. The shaping stage 24 is disposed at a position facing the head portion 22 to retain the three-dimensional object 50 during the shaping so that it faces the head portion 22. Further, in this embodiment, the shaping stage 24 changes the position of the three-dimensional object 50 facing the head portion 22 by performing a sub scanning operation of moving in a sub scanning direction (X direction in the figure) vertically intersecting the main scanning direction relative to the head portion 22. Further, the shaping stage 24 is also capable of moving relative to the head portion 22 in a height direction (Z direction in the figure) vertically intersecting the main scanning direction and the sub scanning direction, and by performing a Z-direction scan that gradually increases a distance between the head portion 22 and the shaping stage 24 according to progress of the shaping, a distance between a topmost surface of the three-dimensional object 50 during the shaping and the head portion 22 is thereby adjusted.

The scan actuator 26 is an actuator that realizes scan operations for relative movement of the head portion 22 with respect to the shaping stage 24, and moves at least one of the head portion 22 and the shaping stage 24 at each timing of performing the main scanning operation, the sub scanning operation, and the Z-direction scan as described above. Further, due to this, it causes the head portion 22 and the shaping stage 24 to perform the main scanning operation, the sub scanning operation, and the Z-direction scan. In this case, more specifically, the scan actuator 26 causes the head portion 22 and the shaping stage 24 to perform the sub scanning operation between main scanning operations to sequentially change a region where the shaping material is to be discharged in each main scanning operation. Further, by performing the Z-direction scan each time predetermined numbers of main scanning operations and sub scanning operations are performed on the topmost surface of the three-dimensional object 50 during the shaping, it causes the head portion 22 to perform operations to sequentially stack and form a plurality of layers. Further, due to this, the scan actuator 26 causes the shaping executing part 12 to perform shaping scan under the laminate shaping scheme using the inkjet method.

It should be noted that the movements of the head portion 22 and the shaping stage 24 in the main scanning operation, the sub scanning operation, and the Z-direction scan may each be a relative movement of one of the head portion 22 and the shaping stage 24 relative to the other. Due to this, in each scan, the scan actuator 26 may move whichever of the head portion 22 and the shaping stage 24.

The shaping controlling part 14 is a controlling part that controls operations of the shaping executing part 12. In this embodiment, the shaping controlling part 14 is configured of a plurality of computers, and at least includes a host PC 32 and a condition setting PC 34. The host PC 32 and the condition setting PC 34 operate according to preinstalled programs, and respectively execute parts of the operations by the shaping executing part 12.

Further, in a variant of a configuration of the shaping controlling part 14, the shaping controlling part 14 may be configured of one computer. In this case, one computer (PC, etc.) having functions of the host PC 32 and the condition setting PC 34 which will be described below may be used. Further, the shaping controlling part 14 may include even a larger number of computers. Further, a part of the functions of the shaping controlling part 14 may be realized by a shaping device that is to be used as the shaping executing part 12. In this case, respective parts of the shaping executing part 12 and the shaping controlling part 14 may be realized by a part of functions of the shaping device.

The host PC 32 is a host computer to be connected to the shaping device to be used as the shaping executing part 12, and it causes the shaping executing part 12 to execute the shaping operations by controlling the operations of the shaping executing part 12 based on print software that is preinstalled. In this case, the print software is a program for controlling the shaping operation (3D printing) under the laminate shaping scheme using the inkjet method. As for the operation that the host PC 32 is to execute based on the print software will be described later in detail. Further, in this embodiment, the host PC 32 receives data indicating a shaping condition from the condition setting PC 34, and controls the shaping operation by the shaping executing part 12 according to this condition.

The condition setting PC 34 is a computer for setting the shaping condition, and sets the shaping condition based on an instruction of a user of the shaping system 10. In this case, the shaping condition is various parameters to be set upon the shaping. In this embodiment, the condition setting PC 34 sets the shaping condition based on preinstalled condition setting software. In this case, the condition setting software is a program for setting various conditions of shaping to be executed by the shaping executing part 12.

It should be noted that as will be described in further detail below, in this embodiment, the shaping system 10 has a function to execute shaping for checking a shaping quality of a target three-dimensional object (shaped object) which is aimed to be shaped as the resulting object (proof shaping). Due to this, the condition setting PC 34 sets at least various conditions for executing the proof shaping as the shaping condition. Further, the condition setting PC 34 notifies the set shaping condition to the host PC 32. An operation that the condition setting PC 34 executes based on the condition setting software will be described later in detail.

Further, in this embodiment, the condition setting PC 34 is a computer provided separately from the host PC 32, and it notifies the set shaping condition to the host PC 32 by being connected to the host PC 32 via a network. Further, the condition setting PC 34 may notify the shaping condition to the host PC 32 via data recorded on various recording media (Universal Serial Bus (USB) memory).

Figure 2:
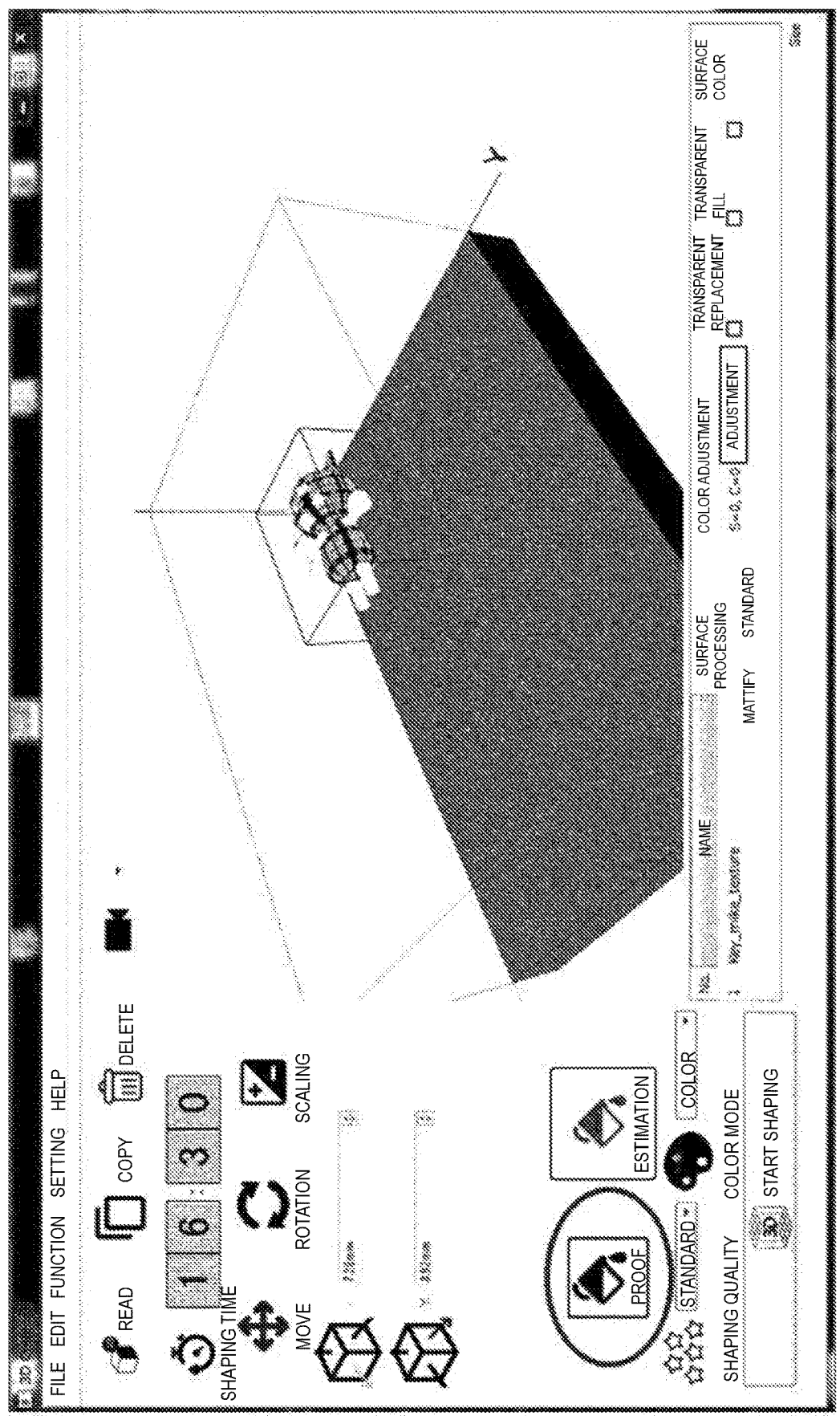
FIG. 2 is a diagram illustrating an example of a screen for setting a shaping condition in a condition setting PC 34.

Next, the operation that the condition setting PC 34 executes based on the condition setting software will be described in further detail. FIG. 2 illustrates an example of a screen for setting the shaping condition in the condition setting PC 34.

In this embodiment, the shaping controlling part 14 (see FIG. 1(a)) accepts a user instruction via a user interface to be operated by the user of the shaping system 10 (see FIG. 1(a)). Further, more specifically in this case in the embodiment, the condition setting PC 34 of the shaping controlling part 14 accepts the user instruction via a graphic user interface illustrated in FIG. 2 according to the condition setting software.

Further, as described earlier, in this embodiment, the shaping system 10 has the function to execute the proof shaping for checking the shaping quality. Due to this, in the screen illustrated in FIG. 2, as indicated by a circle mark therein, a button for performing the condition setting for the proof shaping (proof button) is disposed. When this proof button is pressed by user operation, the shaping controlling part 14 proceeds to a screen for setting the condition of the proof shaping according to the condition setting software. The condition setting for the proof shaping will be described later in further detail.

Further, aside from the feature of the condition setting for the proof shaping, the shaping controlling part 14 preferably accepts user instructions for conditions identical or similar to those of a conventionally known shaping controlling part 14. The condition setting PC 34 of the shaping controlling part 14 accepts an instruction to read the shaping data, and instructions relating to, for example, a setting of a position to shape the three-dimensional object 50. In this case, the setting of the position to shape the three-dimensional object 50 is a setting of the position to shape the three-dimensional object 50 on the shaping stage 24 (see FIG. 1(a)) of the shaping executing part 12 (see FIG. 1(a)). Further, the condition setting PC 34 accepts instructions relating to, for example, movements and rotations relative to a reference position as the instructions for the position setting. Further, the condition setting PC 34 may further accept instructions to enlarge or miniaturize the three-dimensional object to be shaped. Further, it may further accept instructions related to a surface process and color adjustment and the like to be executed on the three-dimensional object. Further, in the illustrated case, the condition setting PC 34 displays an input portion (such as buttons and text boxes) for accepting the various conditions as aforementioned in the graphic user interface screen.

Further, in this embodiment, the condition setting PC 34 further displays time required for the shaping (shaping time). In this case, the shaping time is time expected to take for the case of shaping the target three-dimensional object under the set condition (expected time). By displaying the shaping time, the shaping condition can more suitably be adjusted. Further, a determination on whether to execute the proof shaping can more suitably be made.

Here, the proof shaping to be executed in this embodiment will be described in further detail. As explained earlier, the proof shaping to be executed in this embodiment is the shaping for checking the shaping quality of the target three-dimensional object which is aimed to be shaped as the resulting object. Further, in this case, the shaping controlling part 14 is configured to be capable of executing a first shaping control for causing the shaping executing part 12 to shape the target three-dimensional object using the shaping data that expresses the target three-dimensional object, and a second shaping control for causing the shaping executing part 12 to shape a three-dimensional object for proof (for proof shaping) (proof). Further, in the second shaping control, the shaping controlling part 14 causes the shaping executing part 12 to shape the proof three-dimensional object by using at least a part of the shaping data that expresses the target three-dimensional object.

In this case, the shaping controlling part 14 receives the user instruction via the user interface, and executes one of the first shaping control and the second shaping control according to the received instruction. More specifically, in the screen illustrated in FIG. 2, in a case where the proof button is not pressed and the condition setting for the proof shaping is not set, the shaping controlling part 14 executes the first shaping control. Further, in a case where the proof button is pressed and the condition setting for the proof shaping is set, the shaping controlling part 14 executes the second shaping control. Further, in this case, the shaping controlling part 14 executes one of the first shaping control and the second shaping control when the user presses a shaping start button. As above, in this embodiment, the shaping controlling part 14 receives the instruction on which one of the first shaping control and the second shaping control is to be executed from the user via the user interface. Further, it causes the shaping executing part 12 to shape the target three-dimensional object or the proof three-dimensional object based on the received instruction.

It should be noted that, in this embodiment, the target three-dimensional object is an example of a first three-dimensional object. Further, the proof three-dimensional object is an example of a second three-dimensional object.

In this case, the second three-dimensional object is a three-dimensional object for checking a shaping quality of the first three-dimensional object, and is a three-dimensional object that can be shaped in a shorter period of time than that taken for shaping the first three-dimensional object. The shaping quality is texture, touch feeling, glossiness, and the like of the three-dimensional object to be shaped. Further, in a case of shaping a colored three-dimensional object, the shaping quality may be a color tone or darkness of a color to be applied. Further, capable of being shaped in a short period of time means that the time required for executing the shaping in the shaping executing part 12 is short.

Further, more specifically, as the proof three-dimensional object, it is preferable to shape a three-dimensional object that is smaller than the target three-dimensional object. The proof three-dimensional object may be a three-dimensional object that is a miniature of the target three-dimensional object, or a three-dimensional object corresponding to a part of the target three-dimensional object.

Figures 3A, 3B:
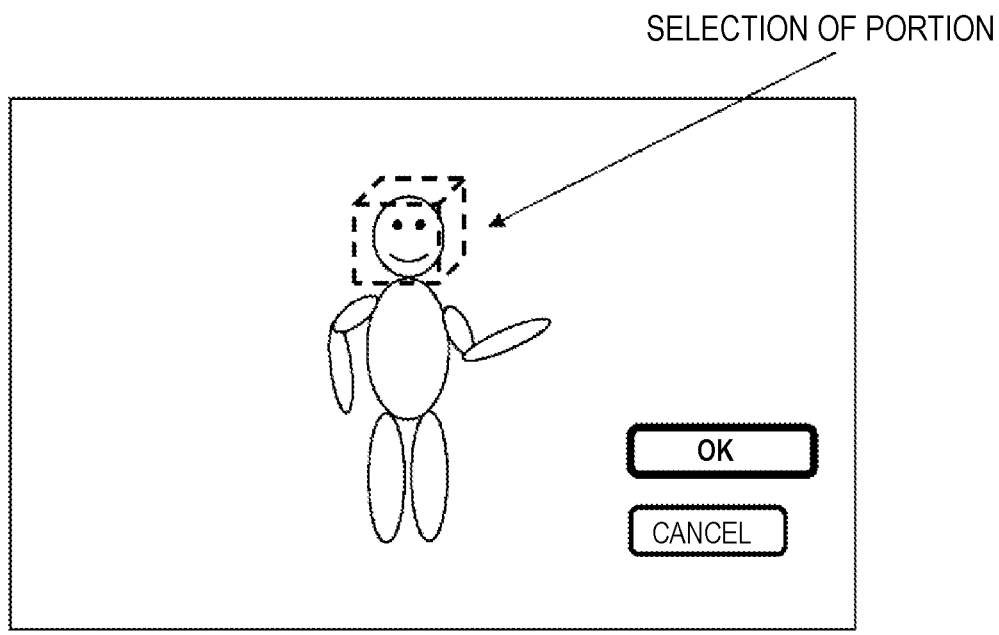
FIG. 3(a) and FIG. 3(b) are diagrams explaining condition setting for proof shaping in further detail.

FIG. 3(a) and FIG. 3(b) are diagrams explaining condition setting for the proof shaping in further detail. FIG. 3(a) illustrates an example of a screen for basic setting (proof setting) in a case of executing the proof shaping. This screen is a screen that the condition setting PC 34 (see FIG. 1(a)) of the shaping controlling part 14 (see FIG. 1(a)) is to display when the proof button is pressed in the screen illustrated in FIG. 2.

In this embodiment, in a case of causing the shaping executing part 12 to shape the proof three-dimensional object, one of two methods, namely a method of shaping a three-dimensional object having a miniaturized shape of the target three-dimensional object (miniaturized proof shaping) and a method of shaping a three-dimensional object having a same shape as a part of the target three-dimensional object (partial proof shaping), can be employed. Further, the shaping controlling part 14 causes the shaping executing part 12 to execute one of the miniaturized proof shaping and the partial proof shaping according to a user's selection.

It should be noted that the miniaturized proof shaping is an operation of shaping a three-dimensional object that is a miniature of an entirety of the target three-dimensional object (full proof). In the case of causing the shaping executing part 12 to execute the miniaturized proof shaping, the shaping controlling part 14 executes conversion on the entirety of the shaping data that expresses the target three-dimensional object according to a set scale-down ratio, and causes the shaping executing part 12 to shape the proof three-dimensional object.

Further, the partial proof shaping is an operation of shaping a three-dimensional object having a shape of an extracted part of the target three-dimensional object. In a case of causing the shaping executing part 12 to execute the partial proof shaping, the shaping controlling part 14 designates a part of the shaping data that expresses the target three-dimensional object, and causes the shaping executing part 12 to execute the shaping only of this part without miniaturizing it. In this case, the shaping controlling part 14 may cause the shaping executing part 12 to execute the shaping based on shaping data that is an extracted part of the shaping data that expresses the target three-dimensional object.

Further, more specifically, in the screen for performing the condition setting for the proof shaping, the shaping controlling part 14 displays a button for designating the scale-down ratio, a button for designating a maximum dimension in one of X, Y, and Z directions, and an input section regarding the setting for the miniaturized proof shaping. Further, it accepts setting of the conditions for the miniaturized proof shaping using these buttons and the display section.

In the illustrated case, the shaping controlling part 14 displays a plurality of buttons indicating a plurality of types of scale-down ratios different from each other. Then, when the user presses a button indicating one of the scale-down ratios, the shaping controlling part 14 sets the scale-down ratio in the miniaturized proof shaping according to the pressed button. Further, due to this, the shaping controlling part 14 receives an instruction for setting the scale-down ratio of the proof three-dimensional object with respect to the target three-dimensional object from the user. Further, in this case, the shaping controlling part 14 automatically calculates the maximum dimensions in the respective X, Y, and Z directions according to the set scale-down ratio, and displays the same in the screen.

Further, in the case of causing the shaping executing part 12 to execute the miniaturized proof shaping, the maximum dimension in one of the X, Y, and Z directions may be designated instead of the scale-down ratio. In this case, the respective X, Y, and Z directions mean the respective X, Y, and Z directions illustrated in FIG. 1(a). Further, the maximum dimension is a maximum dimension of the proof three-dimensional object.

It should be noted that, in the illustrated case, the scale-down ratio is a scale-down ratio with respect to the linear dimension. Due to this, in a case of a scale-down ratio of 1/5 as illustrated in the figure, the shaped object has a volume of 1/125. Thus, in this case, by shaping the miniaturized proof three-dimensional object, the shaping material can significantly be saved, and the shaping time can dramatically be reduced as compared to a case of shaping the entirety of the target shaped object. Further, when the scale-down ratio is to be designated, an arbitrary scale-down ratio may be set by a direct input of numerical values.

Further, in the screen for performing the condition setting for the proof shaping, the shaping controlling part 14 displays a partial proof button, which is a button for selecting the partial proof regarding the setting for the partial proof shaping. Further, in a case where the partial proof button is pressed, the shaping controlling part 14 displays a screen for performing setting for the partial proof.

FIG. 3(b) illustrates an example of a setting screen for partial proof shaping (partial proof setting screen). In the partial proof setting screen, the shaping controlling part 14 determines a portion to be shaped in the partial proof shaping by allowing the user to designate a part of the target three-dimensional object. Further, in this case, by the user pressing a button for confirmation as illustrated in the figure, the screen shifts to the screen illustrated in FIG. 3(a) under a state in which the part to be shaped in the partial proof shaping has been determined, and further instructions from the user are accepted. Further, in a case where the user presses a cancel button illustrated in the figure, the screen shifts to the screen illustrated in FIG. 3(a) under a state in which the part to be shaped in the partial proof shaping has not yet been determined. It should be noted that a range designated by the user may be a smaller range such as an eye or a mouth, being a range of a relief shape having surface protrusions and recesses in a planar direction other than the range illustrated in FIG. 3(b).

More specifically, in FIG. 3(b), a state of selecting only a head portion of a human figure is illustrated. In this case, by the user pressing the confirmation button, the screen shifts to the screen illustrated in FIG. 3(a) under a state in which a condition to shape only the head portion of the figure is to be shaped in the partial proof shaping has been set.

Further, as illustrated in FIG. 3(a), in the screen for performing the condition setting for the proof shaping, the shaping controlling part 14 further displays a preview button, a cancel button, and a start button. Further, a text box to designate the number of shaping is further displayed.

In this case, the preview button is a button for confirming a state of the proof three-dimensional object in advance. In a case where the preview button is pressed by the user, the shaping controlling part 14 displays a preview screen that shows the proof three-dimensional object shaped under the condition set by the user. Further, the cancel button is a button for cancelling the condition setting for the proof shaping. In a case where the cancel button is pressed by the user, the shaping controlling part 14 terminates the condition setting for the proof shaping, and displays a screen that has been displayed before the condition setting for the proof setting. Further, in this case, the shaping controlling part 14 discards (cancels) the condition set in the condition setting for the proof shaping.

Further, the start button is a button for causing the shaping executing part 12 to execute the operation of the proof shaping. In a case where the start button is pressed by the user, the shaping controlling part 14 causes the shaping executing part 12 to shape the proof three-dimensional object by controlling the shaping executing part 12 by the host PC 32 (see FIG. 1(a)) based on the set condition. Further, in this case, it causes the shaping executing part 12 to shape the three-dimensional object by the number designated via the text box for designating the number of shaping.

More specifically, in the case where the selection of the scale-down ratio or the designation of the maximum dimension has been performed, the shaping controlling part 14 causes the shaping executing part 12 to execute the operation of the miniaturized proof shaping based on the set condition. Due to this, the shaping controlling part 14 causes the shaping executing part 12 to shape the three-dimensional object that has been miniaturized by the designated scale-down ratio or maximum dimension as the proof three-dimensional object.

Further, in a case where setting is performed regarding the operation of the partial proof shaping in the partial proof setting screen, the shaping controlling part 14 causes the shaping executing part 12 to execute the operation of the partial proof shaping based on the set condition. Due to this, the shaping controlling part 14 causes the shaping executing part 12 to shape the three-dimensional object that corresponds to a part of the target three-dimensional object as the proof three-dimensional object.

Here, which one of the miniaturized proof shaping and the partial proof shaping is to be executed may be selected according to the shaping quality that should be checked by the proof three-dimensional object. In a case of checking balances of various qualities (such as an overall shape, an overall hue balance) over the entirety of the three-dimensional object, the miniaturized proof shaping may be executed. Further, in the case of executing the partial proof shaping, the quality in a state that reflects the shaping data without any modification can be checked by executing the shaping without miniaturization. In FIG. 3(b), if only the head portion of the human figure is selected, shapes of details such as a nose and ears, and colors of skin and hair may be checked. Due to this, in a case where a detailed check should be performed regarding respective portions of the three-dimensional object, the partial proof shaping may be executed.

It should be noted that, in the case of executing the partial proof shaping, a part of the target three-dimensional object and the proof three-dimensional object having a same shape may mean that they are substantially identical. In this case, being substantially identical may mean that they are identical in terms of their design specs. Further, the shape that is identical to a part of the target three-dimensional object may be a shape that adds an optional portion, such as a portion required by the shaping operation, to a portion of the target three-dimensional object.

Further, in a variant of the configuration of the shaping system 10, the proof shaping may be executed using a method other than the miniaturized proof shaping and the partial proof shaping as aforementioned. Shaping a three-dimensional object having a shape that is a miniature of a part of the target three-dimensional object as the proof three-dimensional object may be executed.

Figure 4:
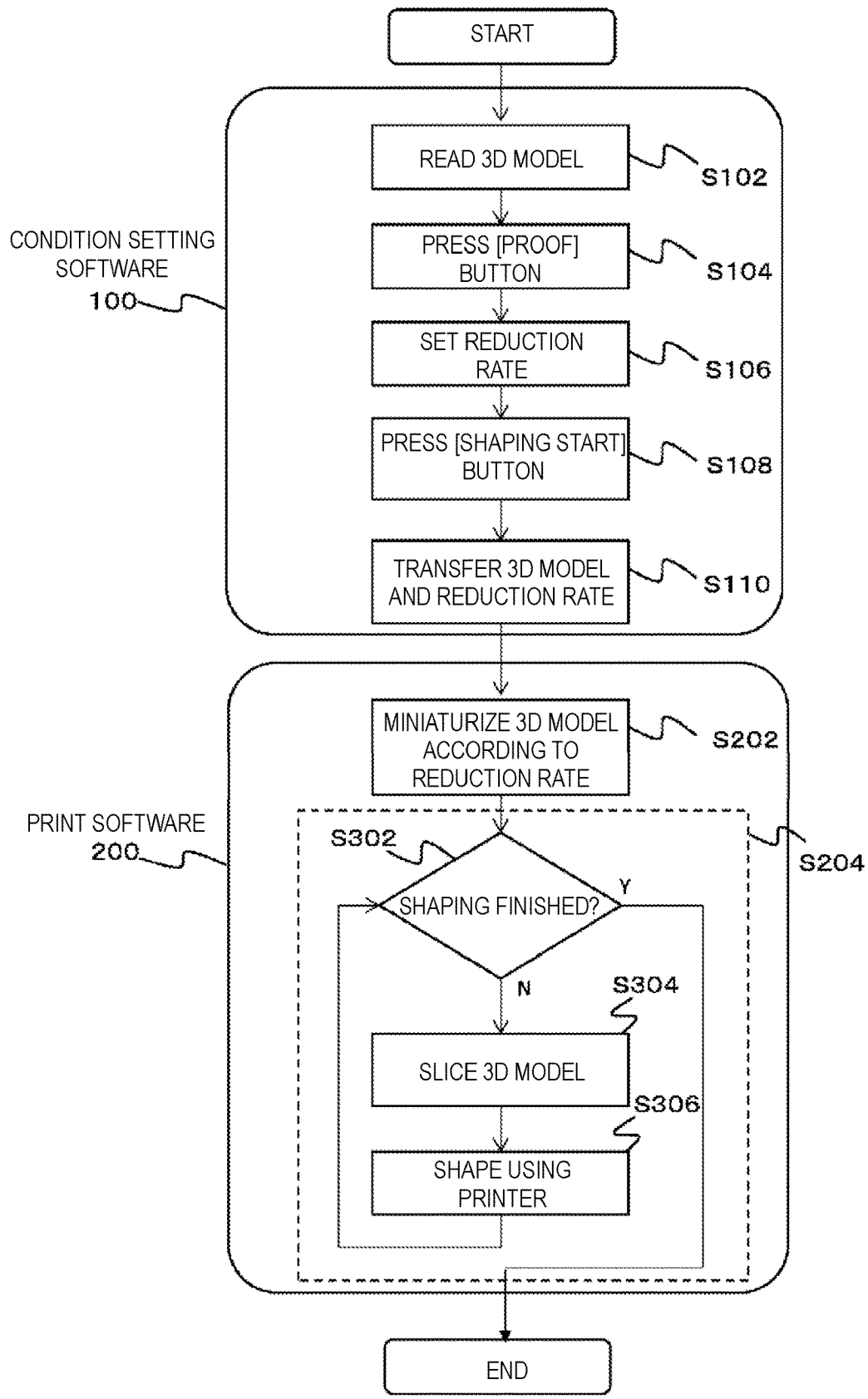
FIG. 4 is a flowchart illustrating an example of an operation of a shaping controlling part 14 in a case of executing miniaturized proof shaping.
Figure 5:
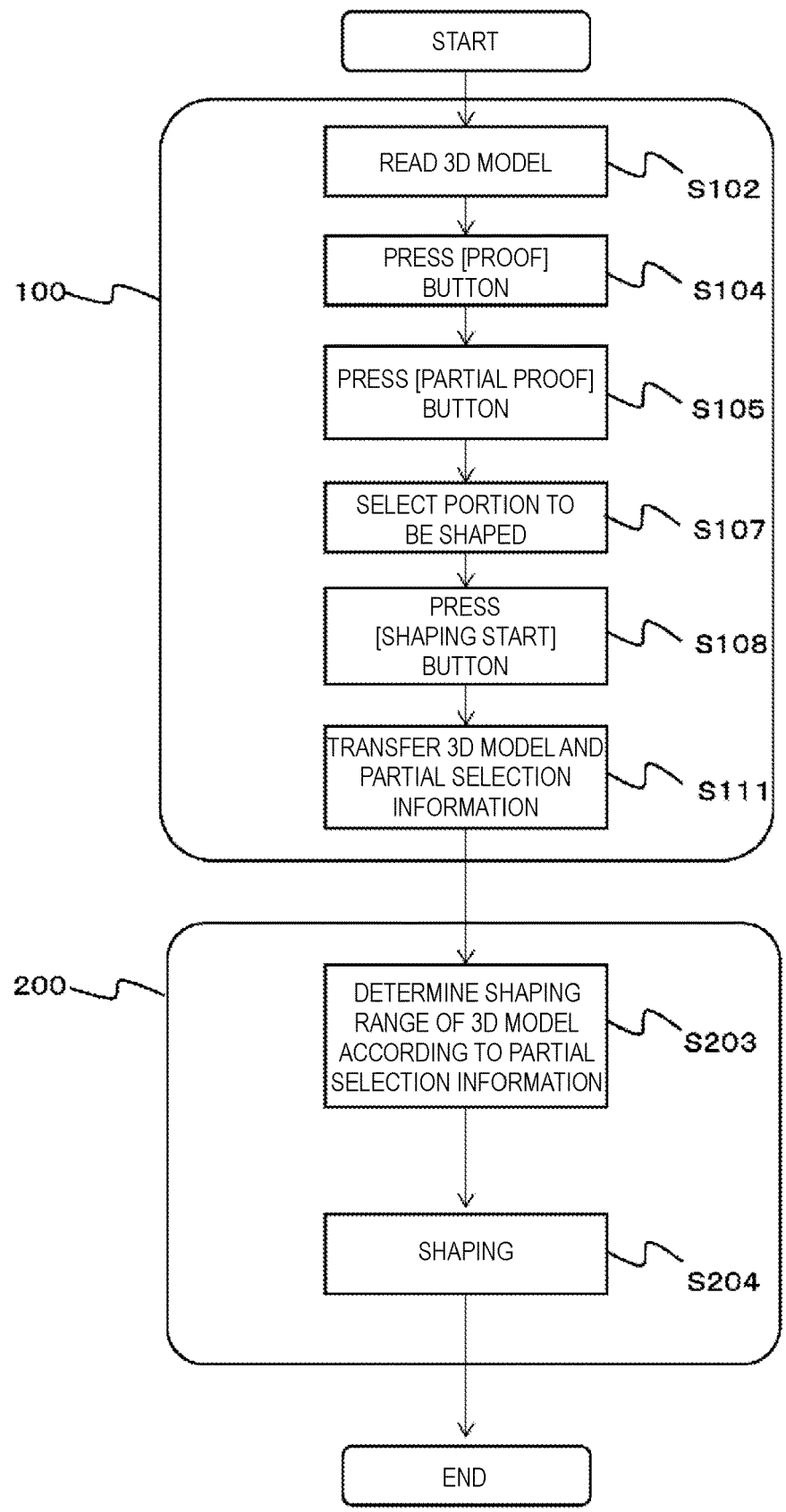
FIG. 5 is a flowchart illustrating an example of an operation of the shaping controlling part 14 in a case of executing partial proof shaping.

Next, in connection to the case of executing the proof shaping, operations executed by the condition setting PC 34 and the host PC 32 based on the condition setting software and the print software will be described in further detail. FIGS. 4 and 5 illustrate an example of the operations executed by the shaping controlling part 14 based on condition setting software 100 and print software 200 in the case of executing the proof shaping.

It should be noted that the condition setting software 100 and the print software 200 are examples of a program for causing the shaping controlling part 14 to execute the control of the shaping operation. As described above, in the shaping controlling part 14 of the embodiment, the condition setting software 100 is executed in the condition setting PC 34 and the print software 200 is executed in the host PC 32. However, in a variant of the configuration of the shaping controlling part 14, the condition setting software 100 and the print software 200 is not be necessarily separated, and may be configured as single software. In this case, this single software may be executed in the host PC 32. Further, in a case where the shaping controlling part 14 further includes a computer other than the host PC 32 and the condition setting PC 34, processes corresponding to a part of the condition setting software 100 or the print software 200 may be executed in the computer other than the host PC 32 and the condition setting PC 34.

FIG. 4 is a flowchart (miniaturized proof flow) illustrating an example of the operation of the shaping controlling part 14 in the case of executing the miniaturized proof shaping. In this embodiment, in a case of executing the miniaturized proof operation, the condition setting PC 34 firstly reads the shaping data (3D data) expressing the target shaped object based on the condition setting software 100 (S102). Then, in the screen illustrated in FIG. 2, the screen shifts to the screen illustrated in FIG. 3(a) in the case where the user presses the proof button (S104), and sets the scale-down ratio (reduction rate) according to the user's operation (S106). Further, after this, the user presses the shaping start button (S108), and the 3D model and the reduction rate are transferred to the host PC 32 (S110).

Further, the host PC 32 that receives the 3D model and the reduction rate from the condition setting PC 34 firstly miniaturizes the 3D model according to the reduction rate based on the print software 200 (S202). Then, it causes the shaping executing part 12, being the printer for the shaping (3D printer), to execute the shaping based on the miniaturized 3D model (S204). Further, in this shaping operation, a process to acquire data that is obtained by slicing the miniaturized 3D model (S304) and a process to cause the shaping executing part 12 to execute the shaping of a portion corresponding to the acquired data (S306) are repeated until when the shaping is completed (S302: N). Further, in a case where the shaping for the entirety of the miniaturized 3D model is completed (S302: Y), the operation based on the print software 200 is terminated.

FIG. 5 is a flowchart (partial proof flow) illustrating an example of the operation of the shaping controlling part 14 in the case of executing the partial proof shaping. It should be noted that aside from the points described below, the configuration and operation (step) in FIG. 5 given the same reference signs as FIG. 4 have characteristics identical or similar to those of the configuration and operation in FIG. 4.

In this embodiment, in a case of executing the partial proof shaping as well, the condition setting PC 34 firstly reads the shaping data (3D data) expressing the target shaped object based on the condition setting software 100 (S102). Further, in the screen illustrated in FIG. 2, the screen shifts to the screen illustrated in FIG. 3(*a*) in the case where the user presses the proof button (S104).

Further, in the case where the user presses the partial proof button in this screen (S105), the screen shifts to the screen illustrated in FIG. 3(*b*), and prompts the user to select the portion to be shaped as the proof three-dimensional object (S107). Further, after this, by the user pressing the shaping start button (S108), the 3D model and part selection information are transferred to the host PC 32 (S111). In this case, the part selection information is information indicating the part that the user selects in the operation of step S107.

Further, the host PC 32 that receives the 3D model and the part selection information from the condition setting PC 34 firstly determines a range of the 3D model (shaping range) to be used in the shaping of the proof three-dimensional object in accordance with the part selection information based on the print software 200 (S203). Then, it causes the shaping executing part 12 to execute shaping through the shaping operation identical or similar to the shaping operation illustrated in FIG. 4 using the data included in the shaping range determined in the 3D model (S204). Then, in a case where the shaping corresponding to the shaping range is finished, the operation based on the print software 200 is terminated.

As above, according to this embodiment, the operations for the miniaturized proof shaping and the partial proof shaping can suitably be executed. Further, due to this, the proof three-dimensional object can suitably be shaped.

Further, in this case, by shaping the proof three-dimensional object which can be shaped in a shorter period of time than that required for shaping the target three-dimensional object, the shaping quality of the target three-dimensional object can suitably be checked in advance without actually taking long time to shape the target three-dimensional object. Further, due to this, a shaping result for the case of shaping the target three-dimensional object thereafter can suitably be prevented from becoming different from what has been expected. Further, when a shaping manufacturer is to perform the shaping according to orders from others such as clients, shaping that meets the expectation of the clients can more suitably be executed by conducting advance checks on the shaping quality and settling agreements thereon with the clients. Due to this, according to this embodiment, the shaping with the desired shaping quality can more suitably be executed.

Further, as the target three-dimensional object, a three-dimensional object having at least a part thereof applied with color may be shaped. The three-dimensional object having a least a part thereof applied with color more specifically means a three-dimensional object having a part of its surface that is visible from outside applied with color. Further, the three-dimensional object being colored means that the object portion of the three-dimensional object is colored. In this case, the surface of the three-dimensional object that is visible from outside is a surface of the object portion.

In the above case, by shaping the proof three-dimensional object being colored identical to the target three-dimensional object, the color tone, darkness, resolution and the like to be expressed on the target three-dimensional object can suitably be checked prior to the shaping of the target three-dimensional object. The proof three-dimensional object being colored identically to the target three-dimensional object is a proof three-dimensional object having its corresponding portion colored in a same color as the target three-dimensional object. By the configuration as above, the target three-dimensional object colored in a desired state can more suitably be shaped.

Here, in a case of coloring the three-dimensional object, various colors are expressed by three-dimensionally arranging three-dimensional pixels (voxels) of a plurality of colors different from each other (yellow, magenta, cyan, and black). However, in this case, as compared to a case of expressing colors using a printer for printing a two-dimensional image (2D printer), there are cases with greater difficulty to express desired colors. With respect to this, according to this embodiment, the target three-dimensional object colored in the desired colors can more suitably be shaped.

Further, in the case of executing the miniaturized proof shaping, there may be cases where some degree of changes would occur in the color tone, darkness, and resolution by an influence of the miniaturization. Due to this, in a case where color states should be checked in greater detail, it is more preferable to execute the partial proof shaping. Further, depending on a required accuracy of the shaping, the color states can suitably and sufficiently be checked by executing the miniaturized proof shaping.

Further, in the case of executing the miniaturized proof shaping, it is preferable to color the proof three-dimensional object by considering the influence of the miniaturization. Thus, hereinbelow, a preferable coloring method in the case of executing the miniaturized proof shaping will be described.

Figure 6:
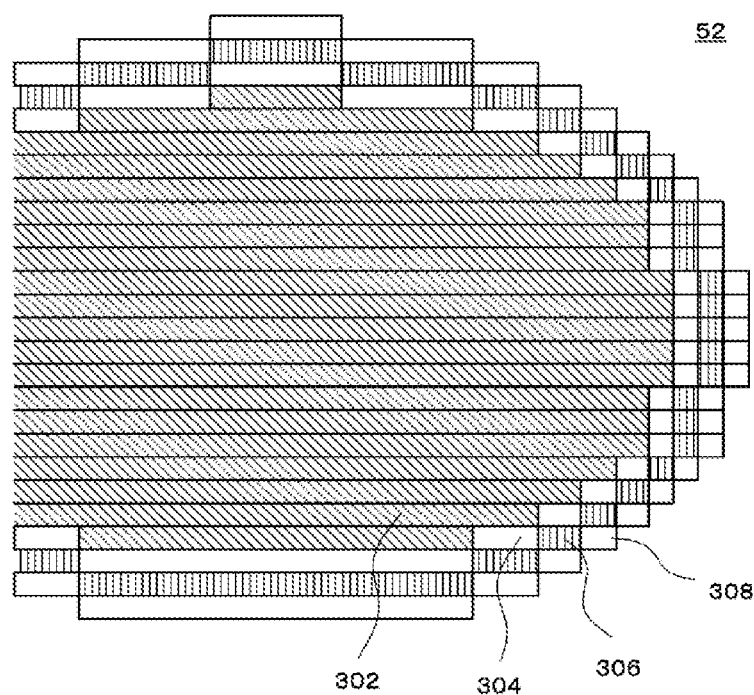
FIG. 6 is a cross-sectional diagram illustrating an example of a configuration of a colored three-dimensional object.

FIG. 6 is a cross-sectional diagram illustrating an example of a configuration of a colored three-dimensional object, and it illustrates an example of a configuration of the object portion 52 in the target three-dimensional object 50 (see FIG. 1(*b*)). In the case of shaping the colored three-dimensional object 50, the shaping is executed for the object portion 52 so that an internal region 302, a white region 304, a colored region 306, and a transparent region 308 are arranged in this order from an inner side toward an outer side by being overlapped. Arranging these regions in this order to overlap them means setting an arrangement order of these regions as the aforementioned order from the inner side toward the outer side of the three-dimensional object 50. Further, in this case, other regions may further be formed between these regions.

The internal region 302 is a region configuring the inside of the object portion 52, and is formed of the modeling material and the like. The white region 304 and the colored region 306 are regions to be applied with color, and are formed at least in a region where the color is to be applied on the surface of the object portion 52. Further, the white region 304 is an example of a light reflecting region being a region formed of a light reflecting material. In this embodiment, the white region 304 is a region formed between the internal region 302 and the colored region 306 by white ink, and it reflects light entering from outside through the colored region 306 by being formed on the inner side of the colored region 306.

The colored region 306 is a region formed by color ink being the coloring material, and is formed using the color ink of a plurality of colors that are different from each other according to a color to be applied to its respective positions. Further, in this embodiment, the colored region 306 is formed by further using hyaline transparent ink in addition to the color ink having chromatic colors. In this case, the transparent ink is used to complement amounts of the color ink at the respective positions so that the ink amount per unit volume becomes uniform at those positions in the colored region.

The transparent region 308 is a region that covers an outer periphery of the object portion 52. The transparent region 308 is formed by transparent ink to allow the colors of the colored region 306 to be visible from outside, and protect an outer side of the object portion 52. By the configuration as above, the colored three-dimensional object can suitably be shaped as the target three-dimensional object.

It should be noted that in a variant of the configuration of the three-dimensional object 50, another region may further be formed as a region configuring the object portion 52. For example, a region made of the transparent region may be formed between the white region 304 and the colored region 306. Further, in another variant, the internal region 302 and the white region 304 may be made of the same white ink, and be formed by discharging the ink from a same inkjet head.

Here, in a case of executing the miniaturized proof shaping on the target three-dimensional object 50 to be colored as in FIG. 6 by simply miniaturizing the target three-dimensional object 50, thicknesses of respective regions configuring the object portion 52 are reduced according to the scale-down ratio. However, when the miniaturization is performed as above, there is a risk that colors that are visible on the proof three-dimensional object and on the target three-dimensional object 50 differ significantly.

Due to this, in the case of executing the miniaturized proof shaping on the colored three-dimensional object 50, it is preferable to carry out the miniaturization by considering changes in colors caused by the miniaturization instead of simply miniaturizing the three-dimensional object 50. Further, more specifically in this case, a three-dimensional object having at least a part thereof colored in a same color as its corresponding position in the target three-dimensional object 50 is shaped as the proof three-dimensional object, and in the region to be applied with the same color, a white region and a colored region corresponding to the white region 304 and the colored region 306 of the object portion 52 of the target three-dimensional object 50 are formed to overlap in this order from an inner side toward an outer side of an object portion in this proof. Further, miniaturization according to the scale-down ratio is not performed regarding thicknesses of the white region and the colored region in the proof three-dimensional object, and thus same thicknesses as the white region 304 and the colored region 306 in the target three-dimensional object 50 are set.

By the configuration as above, the same color as the target three-dimensional object 50 can more suitably be expressed in the proof three-dimensional object. Further, due to this, the shaping quality of the target three-dimensional object 50 regarding the colors to be applied can more suitably be checked in advance.

It should be noted that, in regard to the thicknesses of the white region and the colored region in the proof three-dimensional object, being of the same thicknesses as the white region 304 and the colored region 306 of the target three-dimensional object 50 is not necessarily limited to a case of strictly being identical, and they may be substantially same at a tolerable level according to the shaping accuracy. Further, in this case, the thicknesses being substantially same may mean that their thicknesses are identical in terms of their design specs. Further, the thicknesses of the respective regions being uniform may mean that the number of the three-dimensional pixels (voxels) formed by being overlapped in a vertical direction with respect to the surface of the object portion 52 being the same. Further, in this case, a density of the three-dimensional pixels in a planar direction parallel to the surface of the object portion is preferably adjusted suitably in accordance with the scale-down ratio.

Further, in the proof three-dimensional object, an internal region and a transparent region are formed other than the white region and the colored region similarly to the target three-dimensional object 50. In this case, the transparent region of the proof three-dimensional object is preferably formed to have a same thickness as the transparent region 308 of the target three-dimensional object 50. By the configuration as above, the same color as the target three-dimensional object 50 can more suitably be expressed in the proof three-dimensional object. Further, in regard to a size of the internal region, it is preferably miniaturized by considering the scale-down ratio as well as the thicknesses of other regions (the white region, the colored region, and the transparent region).

Next, a variant of the configuration of the shaping system 10 will be described. In the above, in regard to the setting of the scale-down ratio in the case of executing the miniaturized proof shaping, the explanation is given primarily of the case of setting it in accordance with the user's instruction. However, in a variant of the configuration of the shaping system 10, in regard to the setting of the scale-down ratio, at least a part thereof may be automated. In this case, the scale-down ratio may automatically be set so that the size of the proof three-dimensional object is a preset predetermined size.

Further, in the above, in regard to the selection of the portion to be shaped in the partial proof shaping, the explanation is given primarily of the case of having the user designate a part of the target three-dimensional object. However, in a variant of the configuration of the shaping system 10, in regard to the selection of the portion to be shaped in the partial proof shaping, at least a part thereof may be automated.

More specifically, in this case, a part of the target three-dimensional object may be selected to include a portion within the target three-dimensional object with complicated pattern or detailed shapes, and the partial proof shaping may be executed therefor. Further, a portion having a certain pattern in the target three-dimensional object may automatically be selected. In this case, a human face may be identified by pattern recognition, and a portion including the face may be selected. Further, in these cases, an entire process up to the determination of the portion to be selected is not be necessarily executed fully automatically, but an automatically selected portion may be displayed as a candidate in the screen illustrated in FIG. 3(b), and user's decision may be asked.

Further, in another variant of the configuration of the shaping system 10, the shape of the proof three-dimensional object may be differed from that of the target three-dimensional object. In this case, a shape that is obtained by shape deformation at least for a part of the target three-dimensional object with which the shaping would become easier may be used as the shape of the proof three-dimensional object. In this case, the shape with which the shaping would become easier may be a shape that can be shaped without forming the support portion.

Further, depending on purposes of the target three-dimensional object, a three-dimensional object having a preset simple shape may be shaped as the proof three-dimensional object. As such a simple three-dimensional object, a cylindrical three-dimensional object may be used. Further, in this case, coloring may be performed on the three-dimensional object having the simple shape that is to be shaped as the proof three-dimensional object according to a coloring method that is to be used for the target three-dimensional object. By the configuration as above, the state of the colors to be applied to the target three-dimensional object can more easily checked in advance.

In the respective variants as above as well, the shaping quality of the target three-dimensional object can be checked in advance regarding various points according to features of each variant. Further, due to this, the shaping with the desired shaping quality can more suitably be executed.

Figure 7A:
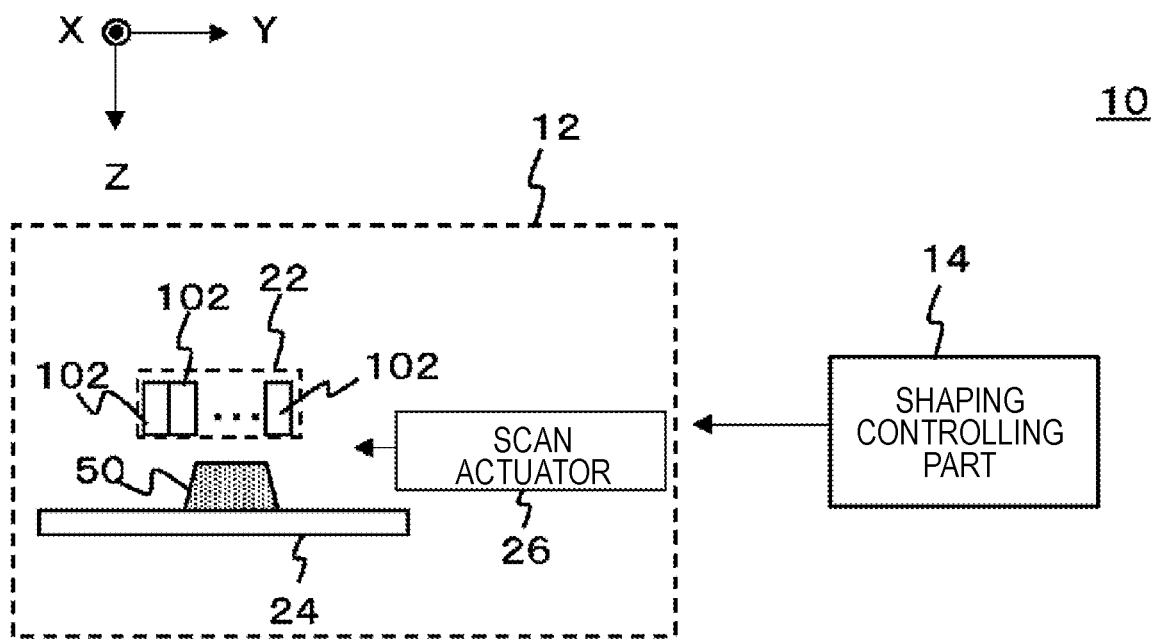
FIG. 7(a) and FIG. 7(b) are diagrams illustrating an example of a shaping system 10 according to an embodiment of the present invention.
Figure 7B:
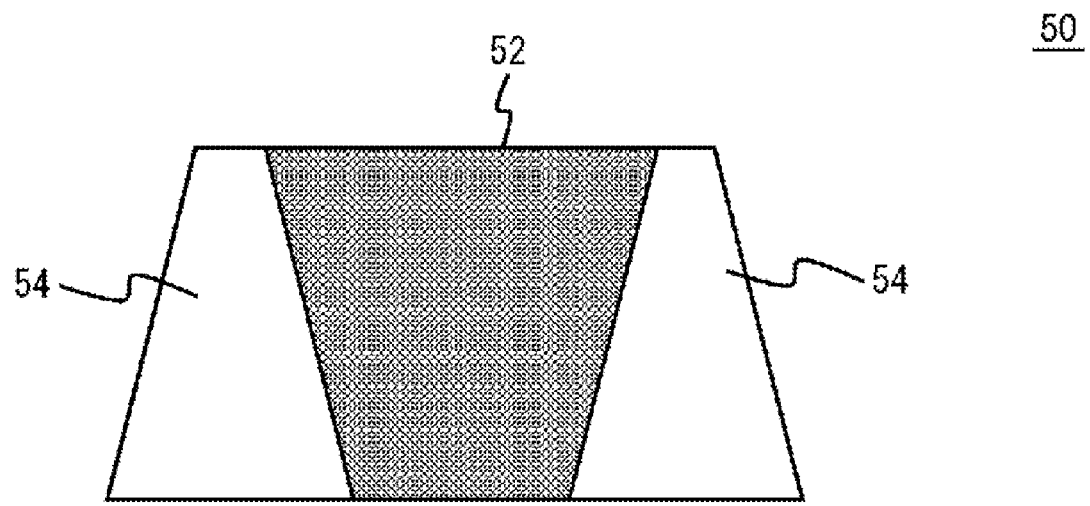

Further, FIG. 7(a) and FIG. 7(b) illustrate an example of the shaping system 10 according to an embodiment of the present invention. FIG. 7(a) illustrates an example of a configuration of a primary part of the shaping system 10.

FIG. 7(b) illustrates an example of a configuration of a three-dimensional object 50 to be shaped by the shaping system 10. It should be noted that as the three-dimensional object 50, the configuration to shape a three-dimensional object including the object portion 52 and the support portion 54 is same as that of FIG. 1(b).

The head portion 22 includes a plurality of coloring inkjet heads 102 that discharge ink droplets of colors different from each other as at least a part of the plurality of inkjet heads 102. In this case, the ink droplets are droplets of the ink. The ink is liquid discharged from the inkjet heads 102. Further, the inkjet heads 102 are discharging heads that discharge liquid (droplets) using the inkjet scheme.

Further, in this embodiment, the head portion 22 includes the inkjet heads 102 for a plurality of colors capable of full-color expression as the plurality of coloring inkjet heads 102. More specifically, the head portion 22 includes the inkjet heads 102 of respective colors of Y (yellow), M (magenta), C (cyan), and K (black) as the plurality of coloring inkjet heads 102. Further, the head portion 22 may further include inkjet heads 102 for colors other than the above. The head portion 22 may further include inkjet heads 102 for R (red), G (green), and B (blue), or for lighter colors of the these colors.

Further, in this embodiment, the head portion 22 further includes inkjet heads 102 other than the coloring inkjet heads 102. In this embodiment, the head portion 22 further includes an inkjet head 102 for the shaping material to be used for the shaping of the interior of the object portion 52. Further, the head portion 22 may further include an inkjet head 102 for the support portion 54 that supports a periphery of the object portion 52 during the shaping. Further, an inkjet head 102 for the white ink for forming a white layer that serves as a background of the coloring ink upon coloring the object portion 52, and an inkjet head 102 for hyaline transparent ink may further be provided. Methods to color the object portion 52 will be described later in further detail.

Further, the inkjet heads 102 in the head portion 22 discharge ink droplets of ink that cures according to a predetermined condition. Further, as such ink, ultraviolet curable ink may be used. Further, in this case, the head portion 22 may further include an ultraviolet light source that emits ultraviolet light. Further, in this embodiment, the head portion 22 discharges the ink droplets of the respective materials configuring the parts of the three-dimensional object 50 by executing a main scanning operation of moving relative to the three-dimensional object 50 in a preset main scanning direction (Y direction in the figure) while discharging the ink droplets.

Further, in this embodiment, the scan actuator 26 executes a main scanning operation, a sub scanning operation, and a Z-direction scan actuation according to instructions from the shaping controlling part 14. Further, due to this, the shaping executing part 12 shapes the three-dimensional object 50 according to the control by the shaping controlling part 14.

Further, more specifically, the shaping controlling part 14 is configured of the host computer connected to the shaping device used as the shaping executing part 12, and a computer for setting conditions to set the shaping conditions. Further, the shaping controlling part 14 may be configured of a single computer having functions of the host computer and the condition setting computer. Further, a part of the functions of the shaping controlling part 14 may be realized by a shaping device that is to be used as the shaping executing part 12. In this case, respective parts of the shaping executing part 12 and the shaping controlling part 14 may be realized by a part of functions of the shaping device.

Further, in this embodiment, the shaping controlling part 14 at least accepts the designation of the shaping color, which is the color of the three-dimensional object 50 to be shaped based on the shaping data from the user of the shaping system 10. Then, it causes the shaping executing part 12 to shape the three-dimensional object 50 so that at least the outer appearance of the three-dimensional object 50 is colored in the designated shaping color. Due to this, the shaping executing part 12 shapes the three-dimensional object 50 according to the control by the shaping controlling part 14. Further, in this shaping operation, at least the surface of the three-dimensional object 50 is colored in the shaping color designated by the user by using the plurality of coloring inkjet heads 102 in the head portion 22.

Here, in this embodiment, the color of the outer appearance of the three-dimensional object 50 is the color of the surface of the three-dimensional object 50. Further, the color of the surface of the three-dimensional object 50 is the color of the region of the object portion 52 of which hue is visible from outside. Further, shaping the object portion 52 so that the outer appearance is colored in the shaping color may mean to color the surface of the object portion 52 with the shaping color so that the object portion 52 as observed from outside is colored in the shaping color. Further, coloring the surface of the object portion 52 includes a case of forming a light permeating region outside of the colored region. The light permeating region is a region formed by the hyaline transparent ink.

Further, in this embodiment, the shaping color designated by the user is the color to be applied to the entirety of the surface of the three-dimensional object 50. Coloring the entirety of the surface of the three-dimensional object 50 to the shaping color more specifically means to color the entirety of the region in the object portion 52 where the color is visible from outside with a single shaping color. By the configuration as above, as compared to a case of applying color to the object portion 52 by drawing a color image on the surface thereof, the designation of the shaping color can be performed easier and more suitably.

It should be noted that the control of the shaping operation executed by the shaping controlling part 14 will be described later in further detail. Further, for the sake of depiction and convenience of explanation, FIG. 7(*a*) and FIG. 7(*b*) illustrate a case of shaping only one three-dimensional object 50. However, in the shaping system 10, a plurality of three-dimensional objects 50 may be shaped simultaneously.

Further, in FIG. 7(*a*) and FIG. 7(*b*), for the sake of depiction and convenience of explanation, an example of the shaping of the three-dimensional object 50 having a simple shape is illustrated. However, in the actual shaping system 10, three-dimensional objects 50 with more complicated shapes may be shaped. Further, depending on the shape of the three-dimensional object 50, the support portion 54 may be formed around the object portion 52 during the shaping.

As above, according to this embodiment, the three-dimensional object 50 can suitably be shaped based on the shaping data. Further, as described earlier, in this embodiment, the shaping color designated by the user is applied to at least the outer appearance (surface) of the object portion 52 by using the plurality of coloring inkjet heads 102 in the head portion 22. In this regard, the methods of coloring the three-dimensional object 50 and the control of the shaping operation by the shaping controlling part 14 as carried out in this embodiment will be described.

Figure 8:
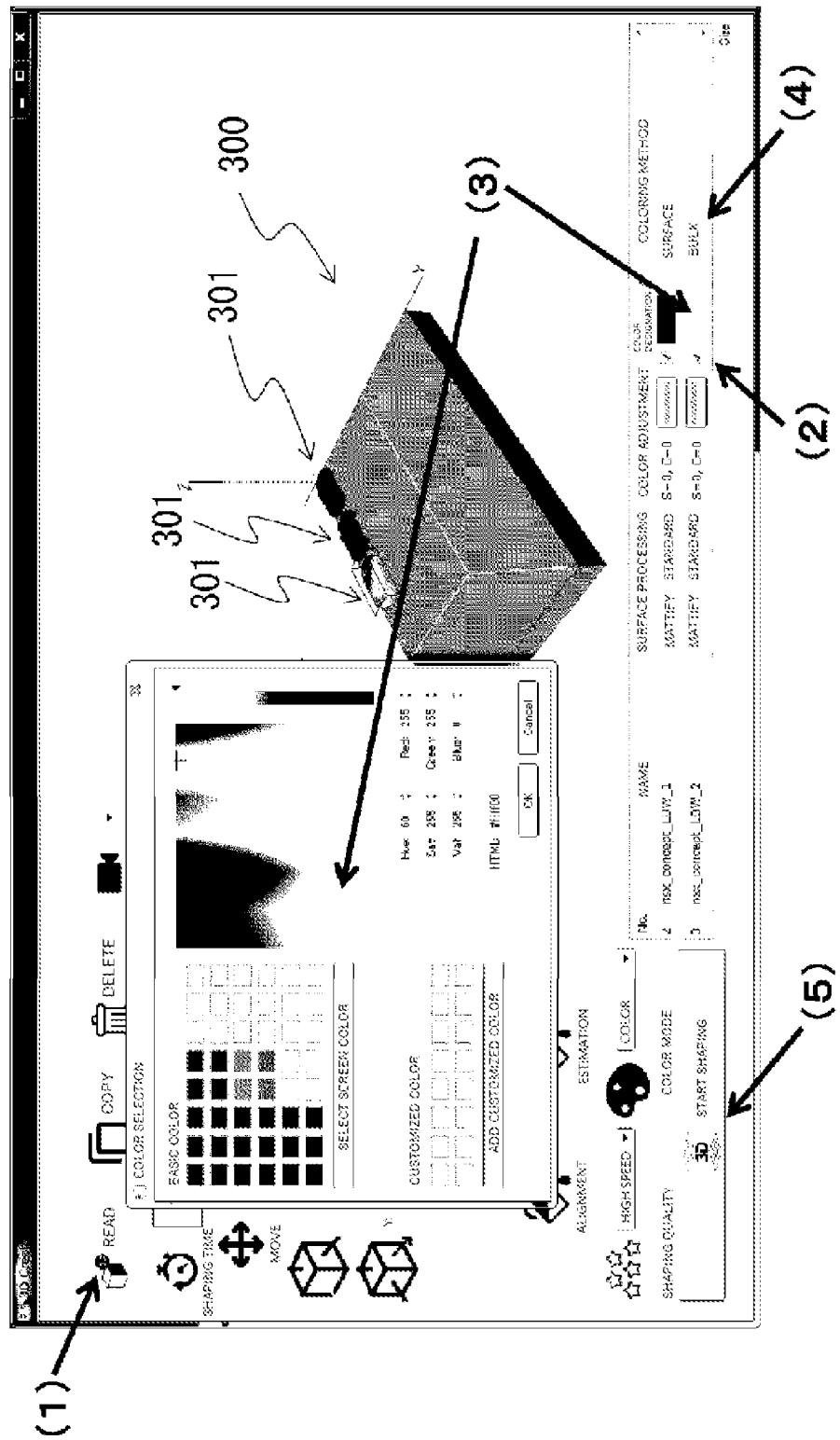
FIG. 8 is a diagram illustrating an example of a user interface for accepting shaping color designation from a user.
Figure 9:
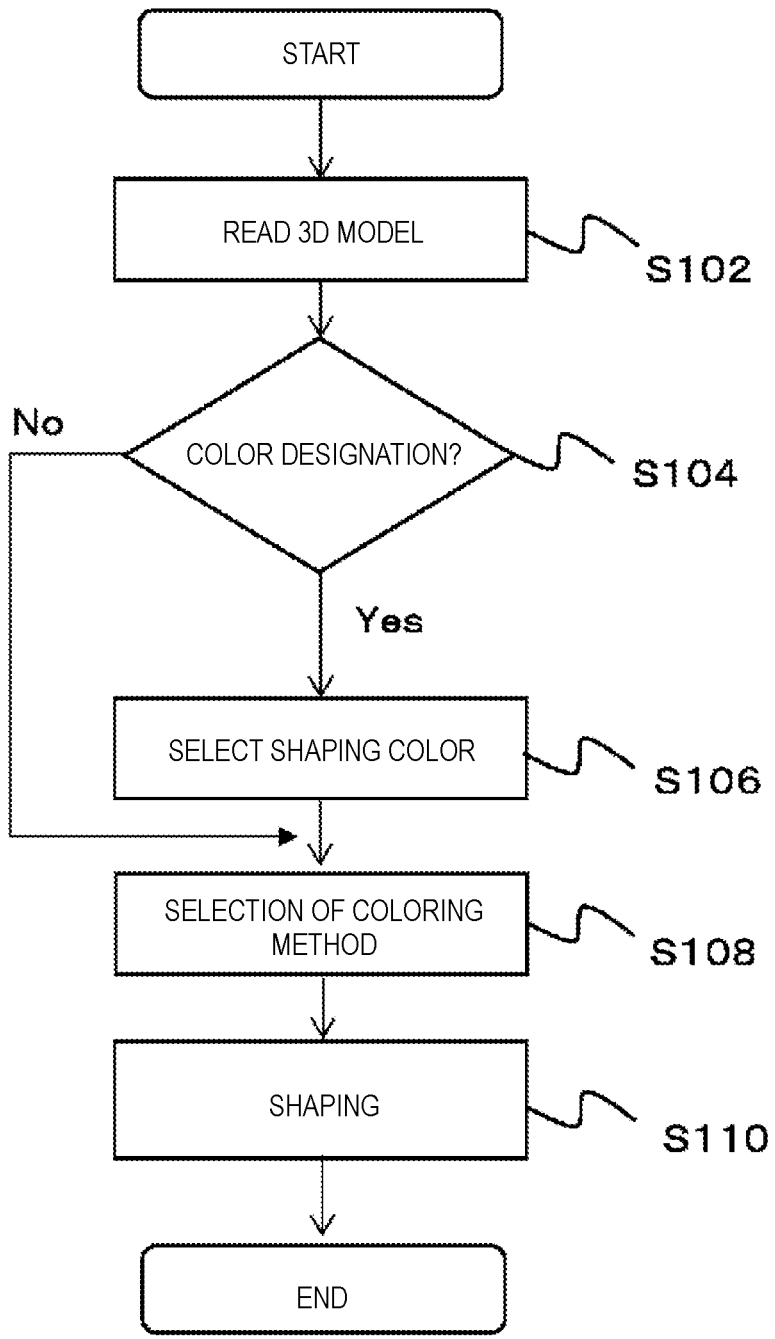
FIG. 9 is a flowchart illustrating an example of an operation of shaping the three-dimensional object 50 colored according to control by a shaping controlling part 14.

FIGS. 8 and 9 are diagrams for explaining the method of coloring the three-dimensional object 50 (see FIG. 7(*a*) and FIG. 7(*b*)). FIG. 8 illustrates an example of the user interface for accepting the designation of the shaping color from the user. FIG. 9 is a flowchart illustrating an example of the operation to shape the colored three-dimensional object 50 according to the control by the shaping controlling part 14.

In this embodiment, the shaping controlling part 14 accepts the instruction related to the shaping from the user, such as the designation of the shaping color and the like from the graphical user interface (GUI) operated by the user of the shaping system 10. Further, more specifically in this case, the user's instructions are accepted by displaying the screen illustrated in FIG. 8.

Further, the user firstly presses a read button indicated by a number (1) in FIG. 8 in this screen. Due to this, the shaping controlling part 14 reads the data of the 3D model which is the shaping data (S102). Further, after this, in the case of designating the shaping color, the user checks a color designating check box indicated by a number (2) in FIG. 8. Then, in the case of executing the designation of the color (color designation) by the checkmark being given (S104: Yes), the shaping controlling part 14 accepts the selection of the shaping color by the user (S106). In this case, the user selects the shaping color using a color icon and a color pallet indicated by a number (3) in FIG. 8. More specifically, in this case, the user clicks on the color icon, and designates the desired color for the shaping from the displayed color pallet.

Further, in this embodiment, in a case where the user does not mark the color designating check box and does not designate color (S104: No), the shaping is executed with a predetermined original color without accepting the selection of the shaping color. This original color may be the color designated by the shaping data, or a preset default color.

It should be noted that the method of designating the shaping color is not limited to the above method, and various other methods may be used. A method of displaying a color preview to prompt selection, a method of allowing input of RGB (Red-Green-Blue) values, and the like may be used. Further, a method of allowing selection from registered customized colors may be used.

Further, in this embodiment, subsequent to the designation of the shaping color, a designation of a coloring method is executed using a selecting portion indicated by a number (4) in FIG. 8. Further, due to this, the shaping controlling part 14 accepts the designation of the coloring method from the user (S108).

More specifically, in this embodiment, the user is prompted to select one of surface coloring and internal coloring (bulk) as the coloring method. In this case, the surface coloring is a method of shaping the surface and vicinity thereof of the object portion 52 by the color ink for coloring, and forming the light reflecting region being the white region (white layer and the like) on the inside thereof. In this case, by reflecting the light that enters by passing through the color ink at the white region and the like, various colors can be expressed. Further, the internal coloring is a method of shaping the entirety of the object portion 52 by the designated shaping color, including the inside thereof.

It should be noted that the coloring method is preferably selected according to characteristics of the ink to be used in the shaping executing part 12 (see FIG. 7(*a*)). In the case of using the ink for expressing various colors by being discharged on the white region, such as the well-known YMCK (yellow (Yellow), magenta (Magenta), cyan (Cyan), black (Black)) ink in the shaping executing part 12, the surface coloring is preferably selected. Further, in a case of using ink that can express various colors regardless of a base color, which expresses colors identically or similarly to well-known paints, the internal coloring may be selected.

Further, after having set the various conditions as above, the user presses the shaping start button indicated by a number (5) in FIG. 8 to cause the shaping executing part 12 to execute the shaping (S110). In this case, the shaping controlling part 14 generates the shaping control data, which is data for controlling the operation of the shaping executing part 12, based on the read shaping data and the conditions such as the shaping color designated by the user. Further, by sending the shaping control data to the shaping executing part 12, it causes the shaping executing part 12 to execute the shaping operation. Further, in this case, by executing the shaping operation according to the shaping control operation received from the shaping controlling part 14, the shaping executing part 12 shapes the three-dimensional object 50 according to the control by the shaping controlling part 14.

Here, more specifically, the shaping control data is a definition file and the like configured of parameters for controlling the operation of the shaping executing part 12. Further, in this embodiment, the shaping controlling part 14 reads the data that at least indicates the shape of the three-dimensional object 50 to be formed as the shaping data. As the shaping data, well-known STL format data and the like may be used. Further, the shaping controlling part 14 generates data that indicates at least the color of the outer appearance and the shape of the three-dimensional object 50 as the shaping control data, based on the shape of the three-dimensional object 50 indicated by the shaping data and the shaping color and the like designated by the user.

Further, the shaping executing part 12 executes the shaping based on the shaping control data to shape the three-dimensional object by the laminate shaping scheme using the inkjet method with the plurality of inkjet heads 102 in the head portion 22 (see FIG. 7(*a*)). Further, in this case, by using the plurality of coloring inkjet heads 102 that respectively discharge the ink droplets of colors different from each other, the colored object portion 52 is shaped with at least its outer appearance colored in the shaping color. Further, in this embodiment, the shaping executing part 12 shapes the object portion 52 so that the entire surface is colored in the shaping color as designated.

According to this embodiment, instead of designating the shaping color to be applied to the object portion 52 by the shaping data, it is designated by the shaping controlling part 14 according to the instructions from the user, by which various shaping colors can easily and suitably be designated. Further, by using the plurality of coloring inkjet heads 102 for the colors different from each other as the coloring inkjet heads 102, the shaping with the designated color can suitably be executed without ink replacements and the like. Further, due to this, the colored object portion 52 can suitably be colored in the desired shaping color with a simple method.

Further, in this embodiment, as illustrated in FIG. 8, a layout 300 upon the shaping is further displayed in the screen for accepting the user's instruction. Further, as the layout 300, a state that predicts a state of the three-dimensional object 50 to be shaped on the shaping stage 24 (see FIG. 7(*a*)) in the shaping executing part 12 is displayed three-dimensionally.

Further, more specifically, in the layout 300, the state of the three-dimensional object 50 to be shaped is shown as an object 301. Further, in a case of simultaneously shaping a plurality of three-dimensional objects 50 in the shaping executing part 12, a plurality of objects 301 corresponding respectively to the plurality of three-dimensional objects 50 are displayed in the layout 300. In this case, for each of the objects 301, the shaping data and the shaping color may be set independently.

Further, in the case of simultaneously shaping a plurality of three-dimensional objects 50 in the shaping executing part 12, the plurality of three-dimensional objects 50 with different colors may simultaneously be shaped using common shaping data. In FIG. 8, a case is illustrated in which the plurality of objects 301 using common shaping data and having differences only in the shaping color designation are arranged as the layout 300. By executing the shaping by setting such a layout 300, the three-dimensional objects 50 having identical shape and different colors can easily and suitably be shaped. In this case, the outer appearances of the three-dimensional objects 50 are colored in different colors but each colored in a single shaping color.

Further, the three-dimensional objects 50 having identical shape and different colors may be shaped sequentially one by one, without necessarily being limited to the case of simultaneous shaping. Due to this, if the operation for shaping the plurality of three-dimensional objects 50 having identical shape and different colors is to be presented in a generalized term, it can be considered to be an operation for the shaping controlling part 14 to receive the designation of the plurality of shaping colors different from each other for single shaping data from the user, and cause the shaping executing part 12 to shape the plurality of three-dimensional objects 50 having identical shape and being colored in the respective shaping colors. By the configuration as above, the shaping executing part 12 can be caused to suitably shape the plurality of three-dimensional objects 50 having identical shape and different colors.

It should be noted that in a case of attempting to shape the plurality of three-dimensional objects 50 having identical shape and different colors using the well-known technique, normally a plurality of pieces of shaping data that indicate the respective colors and shapes of the three-dimensional objects need to be prepared, even for the three-dimensional objects of the identical shape. Due to this, in this case, greater burden is required. Further, each time the color to be applied is to be changed, new shaping data needs to be prepared. In contrast, according to this embodiment, the plurality of three-dimensional objects 50 having identical shape and different colors can easily and suitably be shaped using the common shaping data. Further, in this case, the STL format data or the like may be used without any modification as the shaping data, and the coloring with various colors can easily be executed.

Next, supplemental explanation will be given on the shaping data used in the embodiment, and various configurations of the three-dimensional object 50 to be shaped. Firstly, detailed explanation will be given on the shaping data used in this embodiment.

As described above, in this embodiment, the data that at least indicates the shape of the three-dimensional object 50 to be shaped is used as the shaping data to be read by the shaping controlling part 14. Further, more specifically in this case, the data that indicates the shape of the three-dimensional object 50 to be shaped but does not include color designation may be used as the shaping data. By the configuration as above, a data amount of the shaping data can suitably be reduced. Further, in this case, by accepting the designation of the shaping color from the user in the shaping controlling part 14, the colored three-dimensional object 50 can easily and suitably be shaped.

It should be noted that in the case of using the shaping data that does not include the color designation, it is preferable to set a preset defined color (default color) as the shaping color in the event where the shaping color is not designated by the shaping controlling part 14. By the configuration as above, the three-dimensional object 50 can suitably be shaped even in a case where the shaping color is not designated.

Further, as the shaping data, data that indicates the color of the three-dimensional object 50 in addition to the shape thereof, such as data including the color designation and indicating the shape of the three-dimensional object 50 to be shaped, may be used. In this case, by accepting the designation of the shaping color from the user in the shaping controlling part 14, the three-dimensional object 50 is shaped with the shaping color designated by the user instead of the color designated by the shaping data. More specifically, in the case where the shaping color is designated by the user, the shaping controlling part 14 causes the shaping executing part 12 to shape the three-dimensional object 50 having at least its outer appearance colored in the shaping color. By the configuration as above, the three-dimensional object 50 colored in the designated shaping color can easily and suitably be shaped. Further, in this case, in the shaping controlling part 14, the color designated by the shaping data may be replaced with the shaping color designated by the user. By the configuration as above, the desired shaping color can easily and suitably be set to the region to be colored within the three-dimensional object 50.

It should be noted that in the case of using the shaping data including the color designation and if the shaping color is not designated by the shaping controlling part 14, the color designated by the shaping data may be set as the shaping color. More specifically, in the case where the shaping color designation is not performed by the user, the shaping controlling part 14 causes the shaping executing part 12 to shape the three-dimensional object 50 using the color designated by the shaping data. By the configuration as above, the three-dimensional object 50 can suitably be shaped even in a case where the shaping color is not designated. Further, in the case where the shaping color designation is not performed by the user, the preset default color may be set as the shaping color by ignoring the color designated by the shaping data.

Next, various configurations of the three-dimensional object 50 shaped in the embodiment will be described in further detail. As described earlier, in the shaping system 10 of the embodiment, the three-dimensional object 50 having at least its outer appearance colored in the shaping color designated by the user is shaped. In this case, the color of the outer appearance of the three-dimensional object 50 is the color of the surface of the three-dimensional object 50. Further, in this case, the light permeating region such as the region formed by the transparent ink may be formed on the outside of the colored region of the three-dimensional object 50. Due to this, as the specific configurations of the three-dimensional object 50 taking the light permeating region into consideration, various configurations may be employed.

Figure 10A:
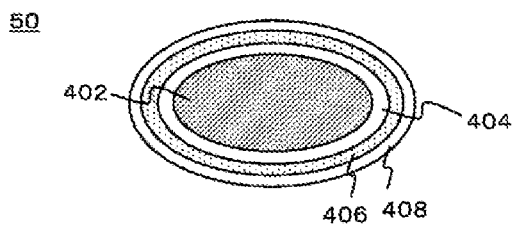
FIG. 10(a) to FIG. 10(d) are diagrams illustrating specific examples of the three-dimensional object 50.

FIGS. 10(a) to 10(d) are diagrams illustrating specific examples of the three-dimensional object 50. FIG. 10(a) is a cross-sectional diagram illustrating an example of the specific configuration of the three-dimensional object 50, and illustrates an example of the state of the three-dimensional object 50 colored in the surface coloring.

In this case, the shaping executing part 12 (see FIG. 7(a)) shapes the three-dimensional object 50 having an internal region 402, a white region 404, a colored region 406, and a transparent region 408. Further, in this case, the internal region 402, the white region 404, the colored region 406, and the transparent region 408 are arranged in this order, as illustrated in the drawings, from the inner side toward the outer side of the three-dimensional object 50.

Further, among these regions, the internal region 402 is the region configuring the inside of the three-dimensional object 50. The shaping executing part 12 forms the internal region 402 by using the inkjet head 102 for the modeling material (see FIG. 7(a)) in the head portion 22 (see FIG. 7(a)). Further, the shaping executing part 12 may shape the internal region 402 using the inkjet head 102 for the white ink or the transparent ink. Further, the internal region 402 may be formed by using the coloring inkjet heads 102. The white region 404 is the region that functions as the light reflecting region. In this embodiment, the shaping executing part 12 forms the white region 404 by using the inkjet head 102 for the white ink in the head portion 22.

The colored region 406 is the region colored in the shaping color. In this embodiment, the shaping executing part 12 forms the colored region 406 using the plurality of coloring inkjet heads 102 in the head portion 22 according to the shaping color designated by the user. The transparent region 408 is the hyaline transparent region covering the outer side of the colored region 406. In this embodiment, the shaping executing part 12 forms the transparent region 408 using the inkjet head 102 for the transparent ink in the head portion 22.

It should be noted that by shaping the transparent region 408, the surface of the three-dimensional object 50 can suitably be protected. The transparent region 408 is preferably formed at a uniform thickness on the surface of the three-dimensional object 50 along the shape of the portion where the colored region 406 is to be formed. By the configuration as above, the surface of the three-dimensional object 50 can suitably be protected.

Further, the specific configuration of the three-dimensional object 50 is not limited to the above, and various variants may be employed. In a variant of the three-dimensional object 50, the transparent region 408 may be omitted. Further, regarding the coloring of the three-dimensional object 50, in the case of executing the same with the internal coloring method instead of the surface coloring, the colored region 406 including the inside and the surface of the three-dimensional object 50 may be formed without forming the internal region 402 and the white region 404.

Figure 10B:
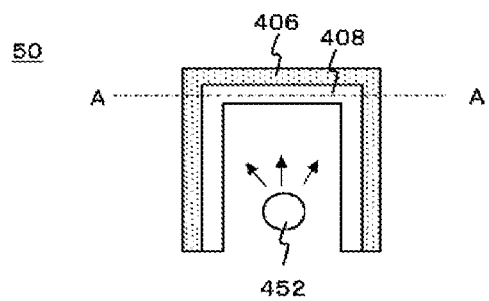
Figure 10C:
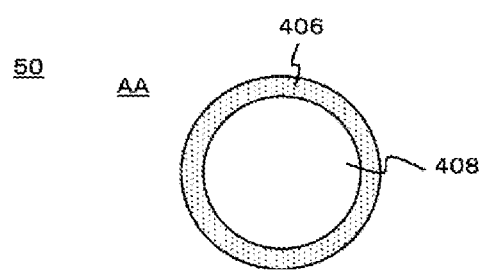

Further, depending on the purpose of the three-dimensional object 50, the inside of the three-dimensional object 50 may be formed hollow. FIGS. 10(b) and 10(c) are diagrams illustrating a variant of the configuration of the three-dimensional object 50, and illustrate an example of the configuration of the three-dimensional object 50 in the case of forming the inside hollow. FIG. 10(b) is a vertical cross-sectional diagram of the three-dimensional object 50 along a predetermined vertical plane. FIG. 10(c) is a horizontal cross-sectional diagram of the three-dimensional object 50 along a horizontal plane passing through a position of a dotted line AA illustrated in FIG. 10(b).

In the case illustrated in FIGS. 10(b) and 10(c), the shaping executing part 12 shapes the three-dimensional object 50 having the transparent region 408 and the colored region 406. In this case, the transparent region 408 is a light permeating region formed in the region surrounding the hollow inside the three-dimensional object 50. The shaping executing part 12 uses the inkjet head 102 for the transparent ink in the head portion 22 to form the hollow transparent region 408 as illustrated in the drawings. Further, the colored region 406 is the region colored in the shaping color designated by the user. The shaping executing part 12 uses the plurality of coloring inkjet heads 102 in the head portion 22 to form the colored region 406 in the region along the outer side of the transparent region 408. Further, due to this, the shaping executing part 12 shapes the three-dimensional object 50 having the transparent region 408 and the colored region 406 overlapped outside the hollow portion.

Further, the three-dimensional object 50 as above may be used by installing a light source 452 in the internal hollow, as illustrated in FIG. 10(b). In this case, a light emitting diode (LED) (white LED, etc.) may suitably be used as the light source 452. By the configuration as above, light generated by the light source 452 permeates through the transparent region 408 and the colored region 406 and is emitted to outside. Further, in this case, even if no white region 404 is formed under the colored region 406, the color of the colored region 406 can suitably be seen from outside. Due to this, in this case as well, the colored three-dimensional object 50 can suitably be shaped in the shaping color designated by the user.

Further, in FIG. 10(a), illustration and explanation are given for the case of forming the transparent region 408 having the uniform thickness along the portion where the colored region 406 is formed. However, in another variant of the configuration of the three-dimensional object 50, the transparent region 408 may be used to form the entire three-dimensional object 50 to achieve a certain shape, regardless of the shape of the portion where the colored region 406 is formed.

Figure 10D:
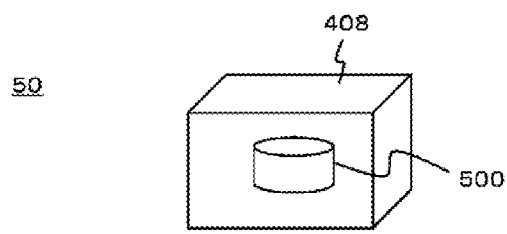

FIG. 10(d) is a diagram illustrating another variant of the configuration of the three-dimensional object 50, and illustrates an example of the configuration of the three-dimensional object 50 for a case of forming the transparent region 408 around a colored portion 500 so that the entire three-dimensional object 50 achieves a certain shape. In this case, the colored portion 500 is a portion including the region where the color is applied and an inner side thereof in the three-dimensional object 50. Further, more specifically, the colored portion 500 may be a portion configured of the internal region 402, the white region 404, and the colored region 406. In this case, the internal region 402, the white region 404, and the colored region 406 may be regions that are identical or similar to those in FIG. 10(a). Further, in the case of coloring the three-dimensional object 50 by the internal coloring, the colored portion 500 may be a portion where its entirety is the colored region 406. Further, in FIG. 10(d), the colored portion 500 having a simple shape is illustrated for the sake of convenience of illustration. However, the shape of the colored portion 500 may be various arbitrary shapes.

Further, in this case, the transparent region 408 is a region that comes to have a certain shape by including the colored portion 500 therein. The shaping executing part 12 uses the inkjet head 102 for the transparent ink in the head portion 22 to form the transparent region 408 so that its outer circumferential shape achieves a preset predetermined shape.

By the configuration as above as well, the color of the colored portion 500 can suitably be seen through the colorless transparent region 408. Due to this, in this case, the color applied to the colored portion 500 may be regarded as the color of the outer appearance of the three-dimensional object 50. Thus, in this case as well, the colored three-dimensional object 50 can suitably be shaped with the shaping color designated by the user by coloring the colored portion 500 in the shaping color.

It should be noted that, in this embodiment, the three-dimensional object is shaped using the inkjet method with the plurality of inkjet heads 102 as described above. In contrast, as a well-known method for shaping a three-dimensional object, a method that executes the shaping by compacting powder is also known. Further in this case, a method of coloring the powder with ink is also known.

However, in a case of executing the shaping using the well-known method using powder, it is impossible to form a transparent region such as the transparent region 408 in the respective configurations as above. Due to this, it is difficult to shape the three-dimensional object 50 including the transparent region 408 as illustrated in FIGS. 10(a) to 10(d). Further, in the case of executing the shaping using the well-known method using powder, it is also difficult to form the colored region 406 with high light permeability. Due to this, it is difficult to shape the three-dimensional object 50 as illustrated in FIGS. 10(b) and 10(c), in which a light source is installed inside the hollow.

In contrast, in the configurations explained with reference to FIGS. 7(a) to 10(d), the three-dimensional objects 50 with various configurations as illustrated in FIGS. 10(a) to 10(d) can suitably be shaped by executing the shaping using the inkjet method. Further, due to this, the colored three-dimensional objects in various configurations can suitably be shaped with a simple method.

INDUSTRIAL APPLICABILITY

The present invention may suitably be used in a shaping system.

The invention claimed is:
1. A shaping system configured to shape a three-dimensional object based on a shaping data that expresses the three-dimensional object, the shaping system comprising:
   a shaping executing part being a section for executing shaping of the three-dimensional object, and the shaping executing part including a plurality of inkjet heads that respectively discharge ink droplets of colors different from each other; and
   a shaping controlling part configured to control an operation of the shaping executing part,
   wherein the shaping controlling part accepts a designation of a shaping color being a color of the three-dimensional object to be shaped based on the shaping data from an user, and causes the shaping executing part to shape the three-dimensional object so that at least an outer appearance of the three-dimensional object is colored in the shaping color which is designated, and
   the shaping executing part shapes the three-dimensional object according to a control by the shaping controlling part, and colors at least an outer appearance of the three-dimensional object in the shaping color designated by the user using the plurality of inkjet heads.
2. The shaping system as set forth in claim 1, wherein the shaping color is a color to be applied to an entirety of a surface of the three-dimensional object.
3. The shaping system as set forth in claim 1, wherein the shaping controlling part accepts the designation of the shaping color from the user via an user interface operated by the user.
4. The shaping system as set forth in claim 1, wherein the shaping data is data that expresses at least a shape of the three-dimensional object to be shaped, and
   the shaping controlling part generates data that expresses at least the color of the outer appearance and the shape of the three-dimensional object as shaping control data for controlling the operation of the shaping executing part, the shaping control data being generated based on the shape of the three-dimensional object expressed by the shaping data and the shaping color designated by the user, and
   the shaping executing part shapes the three-dimensional object having at least the outer appearance colored in the shaping color by executing the shaping based on the shaping control data.
5. The shaping system as set forth in claim 1, wherein the shaping controlling part receives a designation of a plurality of shaping colors that are different from each other from the user, and causes the shaping executing part to shape a plurality of three-dimensional objects, each three-dimensional object having at least an outer appearance colored in a corresponding color, and
   the shaping executing part shapes the plurality of three-dimensional objects having the same shape but different colors according to the control by the shaping controlling part.
6. The shaping system as set forth in claim 1, wherein the shaping data is data that does not include a color designation and that expresses the shape of the three-dimensional object to be shaped.
7. The shaping system as set forth in claim 1, wherein the shaping data is data that includes a color designation and expresses the shape of the three-dimensional object to be shaped,
   in a case where the shaping color is not designated by the user, the shaping controlling part causes the shaping executing part to shape the three-dimensional object using a color designated by the shaping data, and
   in a case where the shaping color is designated by the user, the shaping controlling part causes the shaping executing part to shape the three-dimensional object having at least the outer appearance colored in the shaping color.

* * * * *